(12) United States Patent
Kosugi et al.

(10) Patent No.: US 7,374,019 B2
(45) Date of Patent: May 20, 2008

(54) METHOD OF AND DEVICE FOR LUBRICATING ROLLING BEARINGS

(75) Inventors: Futoshi Kosugi, Kuwana (JP); Masatsugu Mori, Kuwana (JP); Keiichi Ueda, Kuwana (JP)

(73) Assignee: NTN Corporation, Osaka (JP)

( * ) Notice: Subject to any disclaimer, the term of this patent is extended or adjusted under 35 U.S.C. 154(b) by 452 days.

(21) Appl. No.: 10/506,355

(22) PCT Filed: Mar. 3, 2003

(86) PCT No.: PCT/JP03/02447

§ 371 (c)(1),
(2), (4) Date: Sep. 2, 2004

(87) PCT Pub. No.: WO03/074889

PCT Pub. Date: Sep. 12, 2003

(65) Prior Publication Data

US 2005/0252722 A1    Nov. 17, 2005

(30) Foreign Application Priority Data

Mar. 5, 2002 (JP) ............................... 2002-59349
Aug. 12, 2002 (JP) ........................... 2002-234481

(51) Int. Cl.
*F01M 1/00* (2006.01)

(52) U.S. Cl. ..................... 184/6.14; 384/473; 384/471; 417/490

(58) Field of Classification Search ............... 184/6.14, 184/27.1; 384/473, 471, 475; 417/490
See application file for complete search history.

(56) References Cited

U.S. PATENT DOCUMENTS 5,370,089 A * 12/1994 Harada .................. 123/73 AD (Continued)

FOREIGN PATENT DOCUMENTS

JP    10-299784    10/1998

(Continued)

OTHER PUBLICATIONS

Preliminary Notice of Rejection, mailed on Sep. 22, 2006, in a corresponding Japanese Patent Application.

(Continued)

*Primary Examiner*—David M Fenstermacher

(57) ABSTRACT

There is provided a lubricating method for a rolling bearing assembly capable of achieving a reliable lubrication and exhibiting a stable temperature rise. The method is for supplying a lubricant oil to the rolling bearing assembly during the operation thereof, in which in order to keep the temperature of a rolling bearing assembly (103) within a predetermined tolerance, the amount of the lubricant oil to be supplied during the operation is automatically or manually adjusted by means of a supply adjusting unit (102). Supply of the lubricant oil is performed in the form of an air/oil mixture by the use of a lubricant supply unit (101). The amount of the lubricant oil supplied varies depending on the rotational speed of the rolling bearing assembly (103). Change of the amount of the lubricant oil supplied depending on the rotational speed of the rolling bearing assembly (103) is carried out based on a result of sampling of data showing increase in temperature of the rolling bearing assembly (103) depending on the rotational speed thereof under a plurality of different lubricating conditions in which a different amount of the lubricant oil to be supplied is employed.

11 Claims, 16 Drawing Sheets

U.S. PATENT DOCUMENTS

| | | | |
|---|---|---|---|
| 6,105,724 A * | 8/2000 | Stitz et al. | 184/7.4 |
| 6,398,509 B1 * | 6/2002 | Okazaki et al. | 417/44.1 |
| 2002/0009245 A1 | 1/2002 | Sugita et al. | |
| 2002/0048517 A1 | 4/2002 | Sugita et al. | |

FOREIGN PATENT DOCUMENTS

| | | |
|---|---|---|
| JP | 11-063385 | 3/1999 |
| JP | 2001-208085 | 8/2001 |
| JP | 2001-315041 | 11/2001 |
| JP | 2002-054643 | 2/2002 |
| JP | 2002-061657 | 2/2002 |
| JP | 2003-042392 | 2/2003 |
| TW | 83101998 | 7/1996 |

OTHER PUBLICATIONS

Office Action issued on Apr. 17, 2007 in the corresponding Taiwan Patent Application No. 092113989 (10 pages).

* cited by examiner

Direction of Shaft Rotation

Front Side → Rear Side
Direction of Thrust

METHOD OF AND DEVICE FOR LUBRICATING ROLLING BEARINGS

FIELD OF THE INVENTION

The present invention relates to a lubricating method, a lubricating device and an air/oil lubricating structure for lubricating a rolling bearing assembly such as used in supporting a spindle of the machine tool or a ball screw mechanism (a ball and nut drive mechanism), and also to a spindle device utilizing the air/oil lubricating structure.

BACKGROUND ART

The purpose of lubricating rolling bearings is to prevent metallic rolling elements from directly contacting metallic inner and outer races of the rolling bearings by forming a thin oil film on rolling surfaces and sliding surfaces thereof. Lubrication when effected to the rolling bearings brings about the following merits:
(1) Minimization of friction and frictional wear,
(2) Removal of heat evolved as a result of friction,
(3) Increase of the lifetime of the rolling bearings,
(4) Prevention of rusting, and
(5) Prevention of foreign matter from being trapped in the rolling bearings.

In order to enhance those meritorious effects brought about by lubrication, it is necessary to adopt a lubricating method that is appropriate to the conditions under which the rolling bearings are used, to select a lubricant of a high quality and to design an appropriate sealing structure. Designing the sealing structure properly is required for removal of dusts contained in the lubricant, prevention of entrapment of foreign matter and avoidance of leakage of the lubricant.

In general, in the rolling bearing of a type used in rotatably supporting the machine tool spindle, the amount of lubricant oil used is extremely limited to a small value in order to minimize heat build-up resulting from stirring of the lubricant oil. FIG. 7 illustrates the friction loss and the bearing temperature relative to the amount of the lubricant used in such rolling bearing. As shown therein, the amount of the lubricant used is divided into five regions I to V In the lubricant amount region II, in which the temperature rise is lowest, an air/oil lubrication is employed.

In the air/oil lubrication, as shown in an example of the system in FIG. 8, the use is made of a reservoir 134 equipped with a level switch, a pump 135 and a solenoid valve 140 controlled by a timer 141 so that the lubricant oil can be metered accurately for each of the bearings 133 before it is supplied thereto at an optimum interval. After the lubricant oil has been mixed with air within an air supply tube 138 at a terminal end of an oil supply tube 136, the resultant air/oil mixture is jetted to a target portion of the rolling bearing 133 to be lubricated, by means of a nozzle 156 oriented towards such target portion. For this purpose, the air/oil lubricating system is largely employed as a lubricating method that is suitable to increase the rotational speed and lower the temperature rise of the machine tool spindle.

However, during the high speed rotation, the bearing temperature tends to increase, accompanied by lowering the capability of the lubricant oil to form an oil film. In addition, an air curtain formed by the air dragged to whirl around rotating elements of the rolling bearing 133 increases. Therefore, the higher the rotational speed, the more severe the lubricating condition, making it difficult for the lubricant oil, jetted from the nozzle 156, to get trapped inside the bearing 133. Because of this, the amount of the lubricant oil supplied in the air/oil lubricating system is so chosen as to secure a sufficient lubricant reliability during the maximum speed rotation.

With the air/oil lubrication, the amount of the lubricant oil to be supplied is determined in anticipation of the maximum speed rotation that requires the severe lubricating condition as discussed above.

On the other hand, during the low speed rotation, the bearing temperature is low and the capability of forming the air curtain which hampers the supply of the lubricant oil internally into the bearing is also low. For this reason, the lubricating condition is not so severe as that required during the high speed rotation, and the amount of the lubricant oil to be supplied is not required much. In other words, if the amount of the lubricant oil to be supplied to the rolling bearing 133 is determined so that an optimum lubrication condition can be obtained during the high speed rotation, such amount of the lubricant oil would become excessive during the low speed rotation. Since, with the air/oil lubrication, the amount of the lubricant oil falls within the lubricant amount region II in which change in temperature is extremely low, the bearing temperature will rise due to stirring drag if the amount of the lubricant oil to be supplied is excessive as described above.

The increase of the bearing temperature is also brought about by the following additional factors:

As an example of the air/oil lubricant supply, the inventor of the present invention has attempted to suggest a lubricating structure, in which not only is an outer peripheral surface of an inner race of a rolling bearing provided with an inclined surface area continued from a raceway surface of the inner race, but also a nozzle member is disposed along and spaced a predetermined distance from the inclined surface area so that the air/oil lubricant can be jetted from respective air/oil lubricant discharge ports of the nozzle member that are held in face-to-face relation with the inclined surface area. For the rolling bearing, an angular ball bearing or the like is used.

According to the suggested air/oil lubricating structure, the air/oil mixture, which is a lubricant oil mixed with a carrier air, is discharged from the air/oil lubricant discharge ports of the nozzle member and is then introduced into a gap between the inclined surface area of the inner race and the nozzle members. The air/oil mixture so introduced into the gap is subsequently guided into the bearing, being sucked by the effect of a negative pressure developed within the gap during the operation of the bearing, and further guided onto the raceway surface within the bearing and/or an inner peripheral surface of a ball retainer by the action of the surface tension of the lubricant oil, deposited on the inclined surface area of the inner race and a component of centrifugal force acting in a direction towards a large diameter portion of the inclined surface area.

As discussed above, since the air/oil mixture is supplied onto the inclined surface area of the bearing inner race and is not supplied directly onto the raceway surface along which rolling elements move, no wind sound resulting from revolution of the rolling elements is generated with the noise level consequently lowered. Also, since the lubricant oil is not supplied by an air spray, but the air/oil mixture supplied onto the inclined surface area of the bearing inner race is guided into the bearing by the effect of rotation of the bearing inner race, the air used merely serves to transport the lubricant oil to the inclined surface area of the bearing inner race and, therefore, the amount of the air used can be reduced. For this reason, the energy saving effect can also be expected as a result of reduction in the amount of the air used.

However, the above discussed suggestion has not led to disclosure of a specific angle of inclination appropriate for the inclined surface area of the inner race employed in the rolling bearing. In the air/oil lubricating structure such as suggested above, if the inclined surface area of the bearing inner race is designed with no regards paid to the angle of inclination, it has been found that the air/oil mixture deposited on the inclined surface area tends to be separated away from halfway the inclined surface area by the effect of the centrifugal force. Separation of the air/oil mixture away from halfway the inclined surface area of the bearing inner race leads to the incapability of the air/oil mixture efficiently reaching the rolling elements, resulting in lack of a sufficient amount of the lubricant oil. In such case, although it may be suspected that if the respective amounts of air and lubricant oil, both forming the air/oil mixture, are increased, the insufficient lubrication can be avoided, increase of the amount of the lubricant oil would bring about a risk of the increased stirring drag and the temperature rise. Where the bearing employing this air/oil lubricating structure is adopted to support, for example, a spindle device, increase of the bearing temperature brings about change in temperature of the spindle, thus affecting the precision of the spindle. Accordingly, it is necessary to avoid the unnecessary temperature rise by means of the efficient lubrication with a minimized amount of lubricant oil. Also, increase of the amount of air leads not only to increase of the energy consumption, but also a heavy load imposed on a compressor, which in turn increase the noises generated thereby.

Also, even where the above discussed air/oil lubricating structure is applied to such a cylindrical roller bearing 41 as shown in FIG. 24, if the angle of inclination of an inclined surface area 42b of an inner race 42 is not properly chosen, problems similar to those discussed above are unavoidable. In other words, a lubricant oil jetted onto the inclined surface area 42 and approaching a raceway surface 42a via the inclined surface area 42 will, after having reached a large diameter portion of the inclined surface area 42b as shown by the arrow A in FIG. 24, be separated from the inclined surface area 42b by the effect of the centrifugal force and will eventually be blocked off by an end face of a roller retainer 45 without flowing deep into an inner peripheral portion of the roller retainer 45. Because of this, the lubricant oil fails to reach within the interior of the bearing 41 and, hence, the bearing 41 will be lubricated insufficiently. Although even in this case the insufficient lubrication can be avoided if the respective mounts of air and lubricant oil are increased, increase of the amount of the lubricant oil appears to lead to increase of both the stirring drag and the temperature.

DISCLOSURE OF THE INVENTION

In view of the foregoing, the present invention has for its primary object to provide a lubricating method, a lubricating device and an air/oil lubricating structure, all capable of securing the reliability of lubrication and achieving lubrication exhibiting a stable temperature rise, and a spindle device utilizing such air/oil lubricating structure.

A lubricating method for a rolling bearing assembly according to one aspect of the present invention is a lubricating method of supplying a lubricant oil during operation of the rolling bearing assembly, in which the amount of lubricant oil supplied during the operation of the rolling bearing assembly is adjusted for the purpose of suppressing the temperature rise of the rolling bearing assembly.

According to the lubricating method for the rolling bearing assembly, the amount of the lubricant oil to be supplied can be adjusted depending on the lubricating condition during the operation. Because of this, lubrication capable of exhibiting a stable temperature rise while securing the reliability of lubrication is possible within the range of the low to high rotational speed of the bearing assembly.

The supply of the lubricant oil may be carried out in a state of air/oil mixture. The lubrication with the air/oil mixture is effective to achieve the lubrication accompanying a low temperature rise during a high speed rotation. In this lubrication with the air/oil mixture, adjustment of the amount of the lubricant oil during the operation allows a proper lubrication appropriate to a broad range of rotational speeds to be achieved.

Adjustment of the amount of the lubricant oil to be supplied during the operation may be carried out in dependence on the rotational speed of the rolling bearing assembly. Since the proper amount of the lubricant oil to be supplied varies depending on the rotational speed, adjustment of the amount of the lubricant oil in dependence on the rotational speed during the operation is effective to achieve lubrication capable of exhibiting a stable temperature rise while securing the reliability of lubrication, from a low speed rotation to a high speed rotation of the rolling bearing assembly.

It is to be noted that the temperature rise referred to above is affected by not only the amount of the lubricant oil supplied, but also other factors such as load and vibration. However, if the temperature rise is used as a factor with which the amount of the lubricant oil to be supplied is changed or adjusted, there is the possibility that even though the amount of the lubricant oil is proper, the amount of the lubricant oil may be changed, resulting in possible inconveniences of, for example, seizing in the bearing and/or generation of an extreme temperature rise region (maximum region). Those inconveniences can be avoided if the amount of the lubricant oil to be supplied is adjusted in dependence on the rotational speed.

When the amount of the lubricant oil to be supplied is adjusted in dependence on the rotational speed of the rolling bearing assembly as hereinabove described, data on increase of the temperature of the rolling bearing assembly in dependence on the rotational speed may be sampled, under the lubricating conditions in which the various amounts of the lubricant oil are used, so that based on the result of sampling, the amount of the lubricant oil to be supplied may be adjusted in dependence on the rotational speed.

Increase of the temperature of the bearing assembly is determined not only by the geometric shape and the heat dissipation characteristics of the bearing assembly itself, but also those of peripheral component parts of the bearing assembly such as a housing, a shaft and/or sealing device. In such case, it is difficult to predict the behavior of the temperature rise by a simulated experiment including calculation of the temperature rise. However, with the sampling, the temperature rise occurring under various lubricating conditions can be examined and, therefore, the relation between the amount of the lubricant oil and the increase of the bearing temperature can be comprehended. In particular, in the case of the air/oil lubrication, reproducibility of the relation between the amount of the lubricant oil and the increase of the bearing temperature is extremely high and, therefore, a single sampling would be in most cases satisfactorily.

In the case where the samples data are expressed in a graph having the axis of abscissa representing the rotational speed and the axis of ordinates representing the bearing temperature, change of the lubricating condition depending on the rotational speed may result in lowering the point of the extreme temperature rise, or a combination of the lubricating conditions can be taken so that the point of maximum will not be created substantially.

In order to obtain such a combination of the lubricating conditions, for example, a graph is prepared, in which a plurality of curves of different sampled data each for a different amount of the lubricant oil are presented. Using the curves, the course ranging from the minimum rotational speed to the maximum rotational speed without passing the maximum region is determined by selecting a curve portion for each rotational speed region. In such case, since the smaller the number of adjusting the amount of the lubricant oil, the easier the control of the adjustment, if a combination of two different conditions of the amount of the lubricant oil to be supplied leads to elimination of the maximum region, it is preferred to employ a two-stage adjustment of the amount of the lubricant oil. Where the difference in proper amounts of the lubricant oil between the low speed region and the high speed region is large such as observed with the high speed spindle, a combination of three or more different conditions of the amount of the lubricant oil to be supplied may be employed.

Change of the amount of the lubricant oil to be supplied during the operation may be carried out manually or automatically in dependence on a predetermined condition in response to an information signal indicative of the rotational speed. Where the amount of the lubricant oil to be supplied is changed automatically in dependence on the predetermined condition, neither determination nor operation by the attendant operator is needed and the amount of the lubricant oil to be supplied can be automatically performed in dependence on the rotational speed.

The present invention in accordance with a second aspect thereof provides a lubricating device for the rolling bearing assembly, which includes a lubricant supply unit for supplying a lubricant oil during the operation of the rolling bearing assembly, and a supply adjusting unit for ordering the lubricant supply unit to change the amount of the lubricant oil to be supplied in dependence on preset conditions.

With the lubricating device for the rolling bearing assembly, if the supply adjusting unit orders the lubricant supply unit to change the amount of the lubricant oil to be supplied, the stable temperature rise can be exhibited, while the reliability of lubrication is ensured, from a low speed rotational speed to a high rotational speed.

The lubricant supply unit is of a design, for example, in which an air/oil mixture can be discharged to the rolling bearing assembly.

The supply adjusting unit may be of a type capable of ordering the lubricant supply unit to change the amount of the lubricant oil to be supplied in dependence on the rotational speed, so far as the preset conditions are associated with the rotational speed of the rolling bearing assembly. In such case, the amount of the lubricant oil to be supplied is preset for each of a plurality of divided rotational speed regions of the rolling bearing assembly and the supply adjusting unit is operable to select one of the preset amounts of the lubricant oil to be supplied according to an input information on the rotational speed.

Where the lubricant supply unit is operable to intermittently supply the lubricant oil, the supply adjusting unit may be of a type capable of changing the interval of supply of the lubricant oil performed by the supply adjusting unit. Where the lubricant oil is intermittently supplied, change of the amount of the lubricant oil to be supplied may be in accordance with one of the system, in which the amount of the lubricant to be supplied is changed every supply, and the system in which the interval of supply is changed, but the latter system can bring about an advantage in that the control can easily be accomplished. Change of the supply interval may be performed under the control of a timer. The first system results in a relatively complicated construction since it is necessary to mechanically control the opening of, for example, a valve.

The rolling bearing assembly referred to above may be of a type used to support a spindle of a machine tool. The machine tool spindle is increasingly designed to operate at high speeds and is often operated at a rotational speed varying depending on the purpose of machining while suppression of heat generation from the machine tool spindle is strongly required to secure a high machining precision. Thus, the lubricating requirements are rather severe. However, with the lubricating device of the present invention, lubrication is possible even at high speed rotation with the successful suppression of the temperature rise, to thereby meet with the severe requirements discussed above.

The present invention in accordance with a third aspect thereof also provides an air/oil lubricating structure, in which an outer peripheral surface of an inner race of the rolling bearing assembly is provided with an inclined surface area continued to a raceway; a nozzle member is provided along the inclined surface area with a gap formed therebetween; an air/oil discharge port opening towards the inclined surface area is provided in the nozzle member; and the angle of inclination α of the inclined surface area in the inner race relative to the axial direction of the bearing assembly is chosen to satisfy the following relation:

$$\alpha \geq 0.0667 \times dn \times 10^{-4} - 1.8333$$

wherein dn represents the product of the inner diameter (mm) of the bearing assembly multiplied by the rotational speed ($min^{-1}$).

Thus, a series of experiments conducted have revealed that when the minimum necessary value of the angle of inclination α of the inclined surface area of the inner race is fixed, the lubricant oil can assuredly reach the raceway of the inner race without being separated halfway from its travel towards the inner race inclined surface area by the effect of a centrifugal force. Accordingly, an efficient lubrication with the minimum necessary amount of the lubricant oil can be achieved and, while the assured lubrication is performed, the temperature rise can be suppressed. This in turn brings about an increased resistance to seizure and the capability of the rolling bearing assembly at further high speeds. Also, the amount of air used can be reduced to minimum and not only can the energy consumption be suppressed, but also noises can further be reduced.

The preferred maximum value of the angle of inclination α of the inclined surface area of the inner race varies depending on the type of bearing assemblies, but in the case of the cylindrical roller bearing with its inner race having a collar, the preferred maximum inclination angle α is preferably equal to or smaller than 35° and, in the case of the angular ball bearing, the maximum value of the inclination angle α is preferably equal to or smaller than 25°. Also, the minimum value of the inclination angle α is preferably equal to or greater than 25° in the case of the cylindrical roller bearing. In other words, in the case of the cylindrical roller bearing with its inner race having a collar, the angle of inclination α is preferably within the range of 25 to 35°. The reason therefore will now be discussed.

In the case of the cylindrical roller bearing, if the inclination angle α is chosen to be of a value greater than 25°, the tip of the nozzle member can easily be set at a position below a ring portion of the roller retainer. Also, in the case of the cylindrical roller bearing with its inner race having a collar, while a relatively large axially acting load has to be received in the collar of the inner race, increase of the inclination angle α in excess of 35° may result in reduction in radial width of an end face of the inner race formed with the inclined surface area to such an extent that the area of contact between such end face of the inner race and an inner race spacer or a housing may be reduced, resulting in incapability of receiving the large axial load.

In the case of the angular ball bearing, if the inclination angle α exceeds 25°, the radial width of the end face of the inner race where the inclined surface area is formed is reduced to such an extent that the area of contact between such end face of the inner race and an inner race spacer or a housing may be reduced, resulting in incapability of receiving the large axial load.

The angle of inclination α of the inclined surface area referred to above may preferably have the following relation with the discharge angle β, that is the angle formed between the direction of discharge of the air/oil mixture from the discharge port referred to above and the axial direction of the bearing assembly:

$$\alpha < 90° - \beta$$

Specifically, if the angle of inclination α of the inclined surface area is so chosen as to permit the angle between the direction of discharge of the air/oil mixture and the inclined surface area to be of a value greater than 90°. By so choosing the relationship between the inclination angle α and the discharge angle β, the air/oil mixture discharged from the discharge port can satisfactorily flow in response to the centrifugal force even when the discharged air/oil mixture collides against the inclined surface area of the inner race.

The nozzle member referred to above may be of a design in which a discharge groove for the air/oil mixture, which opens towards the inclined surface area, is formed so as to extend in a direction circumferentially of the nozzle member, with the discharge port of the nozzle member opening towards the discharge groove.

The use of the discharge groove is particularly advantageous in that the air/oil mixture discharged from the discharge port of the nozzle member can be introduced through the circumferentially extending discharge groove into a gap between the inclined surface area of the inner race and the nozzle member. Because of this, the air/oil mixture discharged from the discharge port can be distributed circumferentially within the discharge groove, which is larger than the gap between the inclined surface area and the nozzle member, and is therefore equalized over the entire circumference of the discharge groove. Accordingly, a minimized amount of the lubricant oil is sufficient to achieve a further efficient and ensured lubrication.

Also, the inclined surface area of the inner race may be formed with a circumferentially extending groove and the discharge port of the nozzle member may then be so positioned as to open towards a portion of the circumferentially extending groove in the inner race.

Where the inner race is formed with the circumferentially extending groove as hereinabove described, the air/oil mixture can be discharged from the discharge port of the nozzle member into the circumferentially extending groove in the inner race and then flow from the circumferentially extending groove into the gap between the inclined surface area of the inner race and the nozzle member. Because of this, the air/oil mixture discharged from the discharge port can be distributed circumferentially within the circumferentially extending groove, which is larger than the gap between the inclined surface area and the nozzle member, and is therefore equalized over the entire circumference of the circumferentially extending groove. Accordingly, even in this case, a minimized amount of the lubricant oil is sufficient to achieve a further efficient and ensured lubrication. Even though the circumferentially extending groove is provided, the air/oil mixture can smoothly flow into the gap referred to above by the action of a suction pressure, i.e., a negative pressure and a centrifugal force both developed during the operation of the bearing assembly.

Where the rolling bearing assembly is a cylindrical roller bearing having a roller retainer or cage for retaining rollers, the position of a large diameter portion of the inclined surface area of the inner race with respect to the axial direction of the bearing may be located closer to the raceway than to an end face of the roller retainer adjacent the nozzle member. It is to be noted that a cylindrical surface area may intervene between the large diameter portion and the raceway in the inner race.

By choosing the position of the large diameter portion of the inclined surface area with respect to the axial direction of the bearing in the manner described above, the lubricant oil flowing towards the raceway through the inclined surface area of the inner race can be smoothly introduced internally of the bearing without being interrupted by the end face of the roller retainer.

The present invention in accordance with a fourth aspect thereof furthermore provides a spindle device for rotatably supporting a spindle of a machine tool, in which the spindle is supported relative to a housing by means of front and rear rolling bearings, with the rear rolling bearing being employed in the form of a cylindrical roller bearing with its inner race having a collar, and in which the air/oil lubricating structure for the rolling bearing assembly according to the third aspect of the present invention is employed for the rear rolling bearing, with the nozzle member arranged on a front side of the rear rolling bearing.

Where the cylindrical roller bearing with its inner race having a collar is employed for the rear bearing of the spindle device, the contact pressure at an area of contact between a front collar in the rear bearing and an adjacent roller end face will increase under the influence of thermal expansion of the spindle caused by heat developed during the operation of the bearing, resulting in a disadvantage condition of the sliding friction between the collar and the roller end faces. Because of this, the air/oil lubricating structure according to the third aspect of the present invention is applied to the rear rolling bearing and the nozzle member is arranged on a front side of the rear rolling bearing, so that in the rear rolling bearing the lubricant oil can be preferentially supplied to that area of contact between the front collar and the roller end faces. Accordingly, by the action of the air/oil lubricating structure for the rolling bearing assembly according to the third aspect of the present invention as discussed above, lubrication of the collar and the roller end faces can be performed effectively.

BEST MODE FOR CARRYING OUT THE INVENTION

Figure 1:
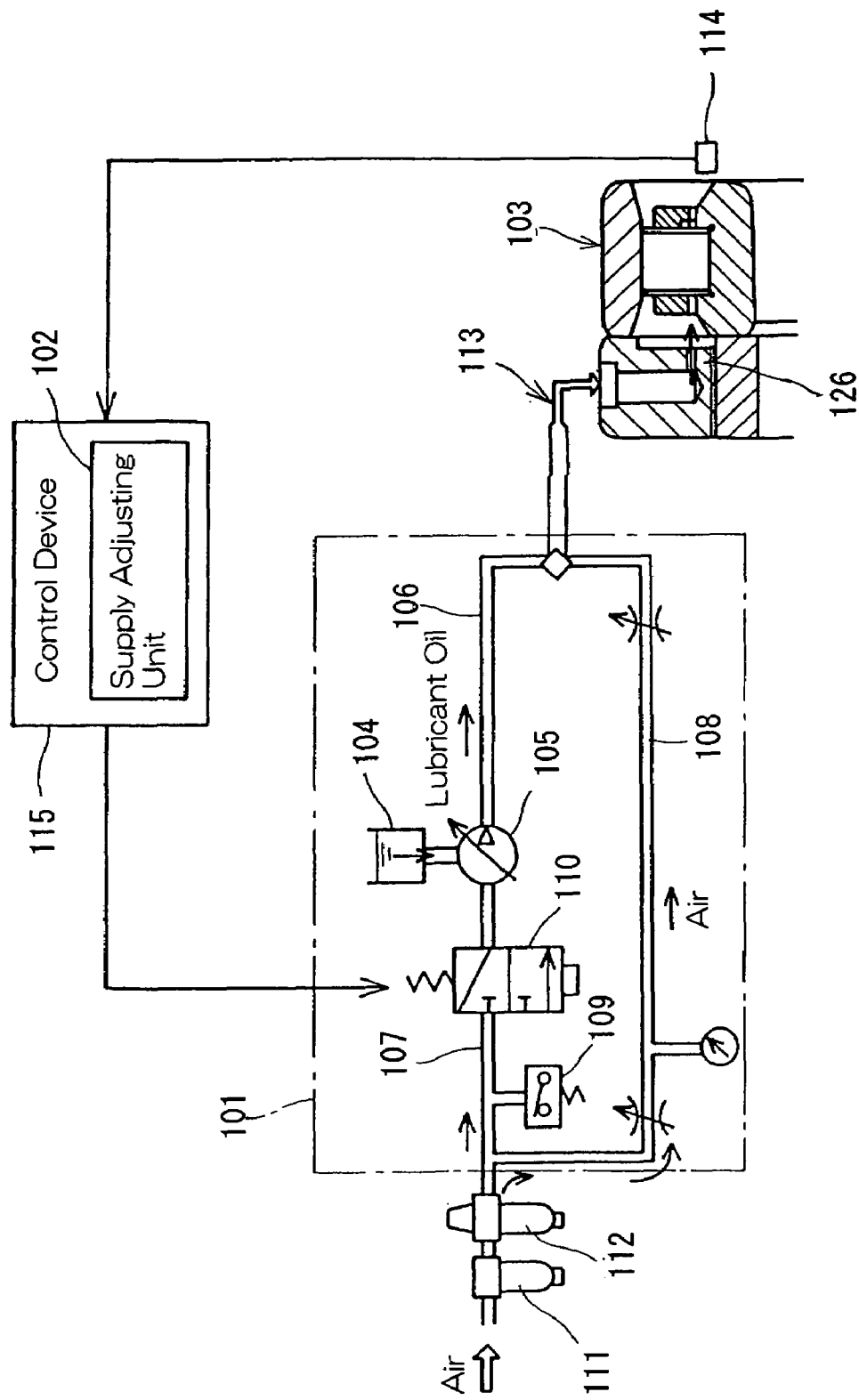
FIG. 1 is a schematic diagram showing a lubricating device utilizing a lubricating method for a rolling bearing assembly according to a first preferred embodiment of the present invention.

A lubricating method for a rolling bearing assembly according to a first preferred embodiment of the present invention will be described in detail with reference to FIGS. 1 and 2. FIG. 1 illustrates a schematic structure of a lubricating device used in the practice of the lubricating method for the rolling bearing assembly. The lubricating device includes a lubricant supply unit 101 and a supply adjusting unit 102. The lubricant supply unit 101 is operable to supply a lubricant oil during the operation of the rolling bearing assembly 103. The supply adjusting unit 102 is operable to order the lubricant supply means 101 to change the amount of the lubricant oil during the operation of the rolling bearing assembly 103 in dependence on preset conditions.

The lubricant supply unit 101 is capable of intermittently discharging an air/oil mixture towards the rolling bearing assembly 103 and is so constructed as hereinafter described. Specifically, the lubricant supply unit 101 includes a pump 105 for supplying the lubricant oil within a tank 104 under pressure to an oil passage 106 by means of a carrier air, an air supply passage 107 fluid connected with an upstream portion of the pump 105, and an air supply branch passage 108 branched off from the air supply passage 107 and then merged with a downstream end of the oil passage 106. The tank 104 is equipped with a level switch and is capable of accommodating a predetermined amount of the lubricant oil, required for a single discharge shot, from another tank (not shown). The air supply passage 107 includes a solenoid valve 110 disposed thereon and can supply the lubricant oil under pressure from the pump 105 only when the valve 110 is opened.

A pressure responsive switch 109 is disposed in the air supply passage 107 at a location upstream of the solenoid valve 110. Air having been filtered through an air filter 111 and a mist separator 112 is supplied under pressure from upstream of the branching point to the air supply passage 107 and the air supply branch passage 108. The air supply branch passage 108 is provided with a variable throttle valve so that the amount of air flowing therethrough can be adjusted. The air is supplied under pressure through the air supply branch passage 108 at all times.

The lubricant oil within the oil passage 106 is mixed with the air, supplied under pressure through the air supply branch passage 108, at a point of merge between the oil passage 106 and the air supply branch passage 108, to thereby form an air/oil mixture. This air/oil mixture is subsequently supplied through an air/oil line 113 before it is delivered onto the bearing assembly 103 from a nozzle 126 disposed at a terminal end of the air/oil line 113.

The supply adjusting unit 102 is a unit for supplying to the lubricant supply unit 101 an information signal descriptive of the amount of the lubricant oil to be supplied and is provided in a control device 115. This control device 115 includes a computer system and is provided with a software program for controlling the rotational speed of a spindle, supported by the rolling bearing assembly 103, and the lubricating condition of the lubricating device. A portion of this software program forms the supply adjusting unit 102.

The control device 115 may be a device for controlling the entire machinery such as a machine tool provided with the rolling bearing assembly 103. Also, this control device 115 may be comprised of either a personal computer or a computer-controlled programmable controller or any other tool having a controlling functionality. Yet, the control device 115 may be a device provided separately from that for controlling the machine equipped with the rolling bearing assembly 103.

The supply adjusting unit 102 is operable to generate the information signal descriptive of the amount of the lubricant oil to be supplied, in response to an information signal descriptive of the bearing rotational speed detected by a rotational speed detecting unit 114. The rotational speed detecting unit 114 is operable to detect the rotational speed of a shaft, supported by the rolling bearing assembly 103, or of a drive motor (not shown) for driving such shaft, or may be of a type capable of obtaining the bearing rotational speed based on a command value used to control the drive motor.

An amount of the lubricant oil to be supplied is preset for each of divided rotational speed regions of the rolling bearing assembly 103 and the supply adjusting unit 102 is operable to compare the present rotational speed represented in r.p.m, inputted from the rotational speed detecting unit 114, with a predetermined or reference speed dividing the rotational speed regions, to determine which speed region the present rotational speed belongs to so that a signal indicative of the appropriate amount of the lubricant oil to be supplied for the determined rotational speed region can be outputted from the supply adjusting unit 102. The number of the rotational speed regions may be two or three or more.

The information signal descriptive of the amount of the lubricant oil to be supplied is, so far as the illustrated embodiment is concerned, in the form of a command used to order the lubricant supply unit 101 to change the interval of supply of the lubricant oil. More specifically, the command is outputted according to a predetermined supply interval to open the solenoid valve 110.

The rolling bearing assembly 103 to be lubricated is a bearing used to support a spindle of, for example, a machine tool. The rolling bearing assembly referred to above is a single row cylindrical roller bearing shown in FIG. 2 and includes a plurality of rolling elements 124, each comprised of cylindrical roller, which are interposed between respective raceways 122a and 123a of an inner race 122 and an outer race 123. The rolling elements 124 are rollingly accommodated within respective pockets defined in the retainer 125.

The nozzle 126 is in the form of a ring-shaped member, having one or a plurality of discharge ports 128 defined therein in a direction circumferentially thereof. This nozzle 126 is operable to blow the air/oil mixture towards the raceway 122a of the inner race 122 from outside of the bearing assembly 103. The nozzle member 126 is fitted to a housing 126 to which the outer race 123 of the bearing assembly 103 is mounted. Fitting of the nozzle member 126 to the housing 129 may be done through an outer race spacer (not shown). Respective inlets of the discharge ports 128 of the nozzle 126 are fluid connected with the air/oil line 113 through a passage portion 113a defined within the housing 129.

Figure 2:
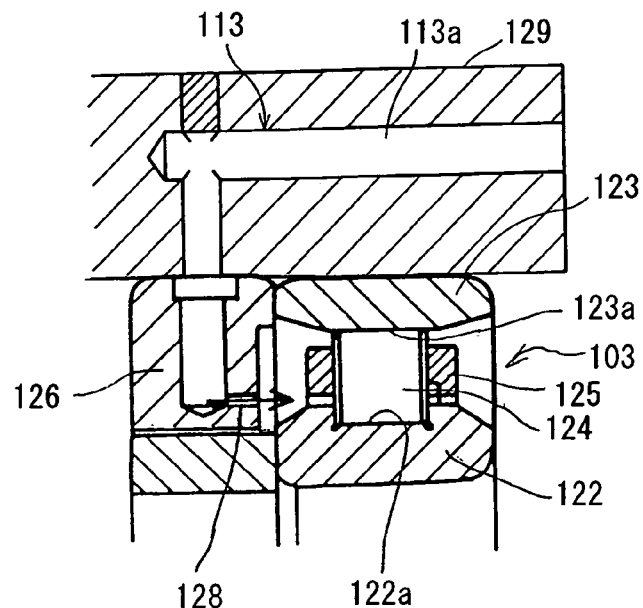
FIG. 2 is a sectional view, on an enlarged scale, showing the rolling bearing assembly, which is to be lubricated by the lubricating method, and surrounding component parts thereof.

It is to be noted that although the rolling bearing assembly 103 has been described as including the inner race having a collar so far as shown in FIG. 2, it may be of a type including the inner race having no collar, but including the outer race having a collar, or in the form of a ball bearing such as an angular ball bearing. Also, the nozzle 126 may be of a design such as shown in FIG. 3A or 3B as will be described subsequently.

Figure 3A:
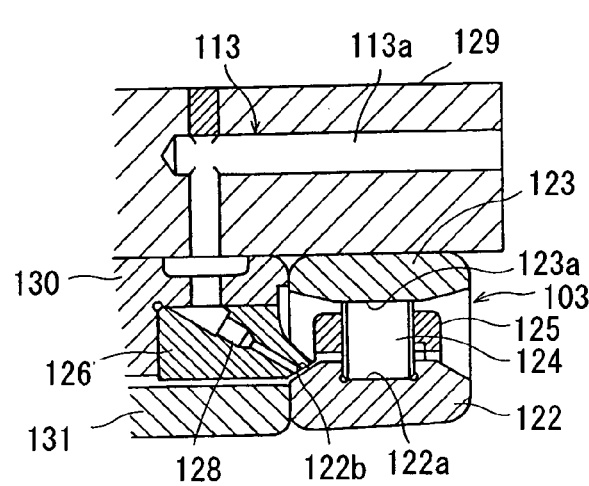
FIG. 3A is a sectional view, on an enlarged scale, showing another rolling bearing assembly, which is to be lubricated by the lubricating method, and surrounding component parts thereof.

In the example shown in FIG. 3A, an inclined surface area 122b is formed on an outer peripheral surface of the inner race 122 of the rolling bearing assembly 103 and is continued from the raceway 122a, with the nozzle 126 so positioned as to form a gap between it and the inclined surface area 122b. The nozzle 126 is in the form of a ring-shaped member, having one or a plurality of discharge ports 128 defined therein in a direction circumferentially thereof. Mounting of the nozzle member 126 to the housing 129 is carried out through an outer race spacer 130, or fitted directly to the housing 129.

Figure 3B:
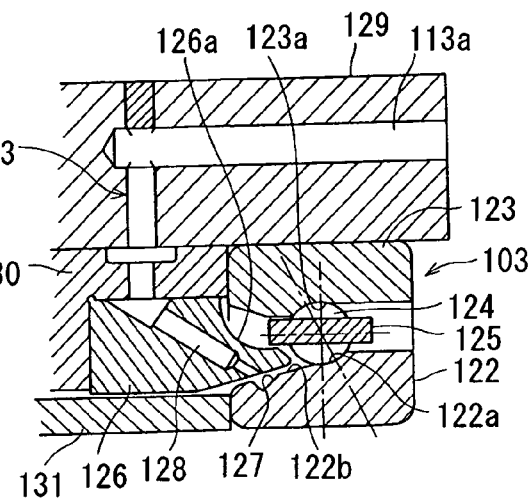
FIG. 3B is a sectional view, on an enlarged scale, showing a further rolling bearing assembly, which is to be lubricated by the lubricating method, and surrounding component parts thereof.

In the example shown in FIG. 3B, the rolling bearing assembly 103 is in the form of an angular ball bearing. In the example shown therein, a circumferentially extending groove 127 is defined in the inclined surface area 122b, with the nozzle 126 opening towards this circumferentially extending groove 127. The use of the circumferentially extending groove 127 can be equally applied not only to the ball bearing, but also any other rolling bearing assembly such as a cylindrical roller bearing.

Hereinafter, the lubricating method for the rolling bearing assembly according to the first embodiment of the present invention, which utilizes the lubricating device of the structure described above, will be described. During the operation of the rolling bearing assembly 103, the rotational speed of the inner race of the rolling bearing assembly 103 is monitored by the rotational speed detecting unit 114. The information signal indicative of the rotational speed detected by the rotational speed detecting unit 114 is compared by the supply adjusting unit 102 with a predetermined speed (r.p.m) dividing the rotational speed regions, and the supply adjusting unit 102 subsequently outputs a signal indicative of the preset supply amount for the corresponding speed region. This signal is used for causing the solenoid valve 110 to be brought in an opened position and the interval of this signal represents the interval of supply of the air/oil mixture from the nozzle 106.

The supply adjusting unit 102 divides the rotational speed range into, for example, two rotational speed regions such that the interval of supply of the air/oil mixture is long for a low speed region and short for a high speed region. By way of example, the long interval may last for 15 minutes while the short interval may last for 5 minutes. Thus, the supply adjusting unit 102 causes the lubricant supply unit 101 to change the amount of the lubricant oil to be supplied during the operation and, therefore, from the low speed rotation to the high speed rotation, a stable temperature increase of the bearing assembly 103 can be exhibited while the reliability of lubrication is secured.

Hereinafter, the manner of determining the rotational speed at which the amount of the lubricant oil to be supplied is changed will be described in conjunction with experimental examples.

Figure 4:
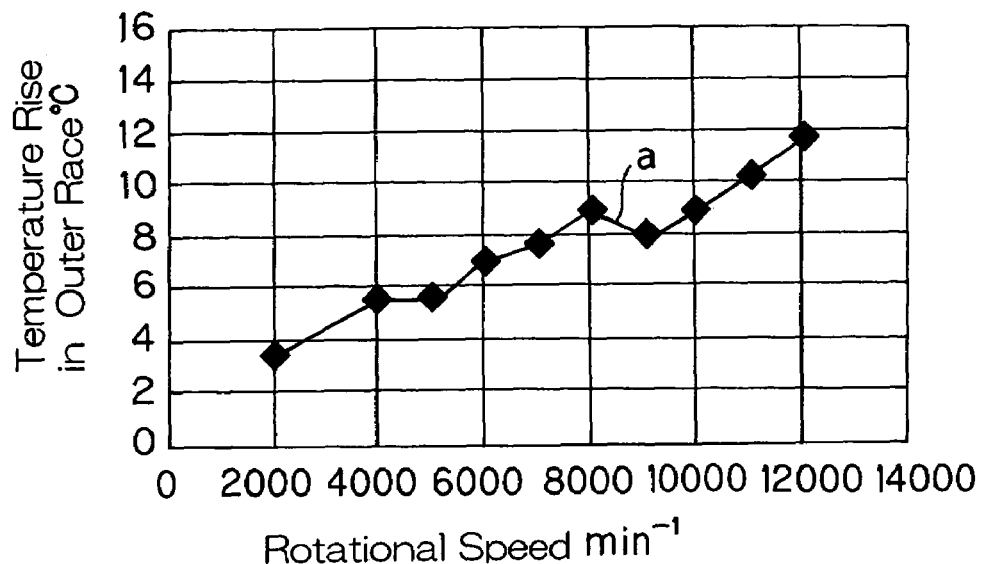
FIG. 4 is a graph showing a result of experiment conducted under a lubricating condition in which the amount of a lubricant oil is maximum.
Figure 8:
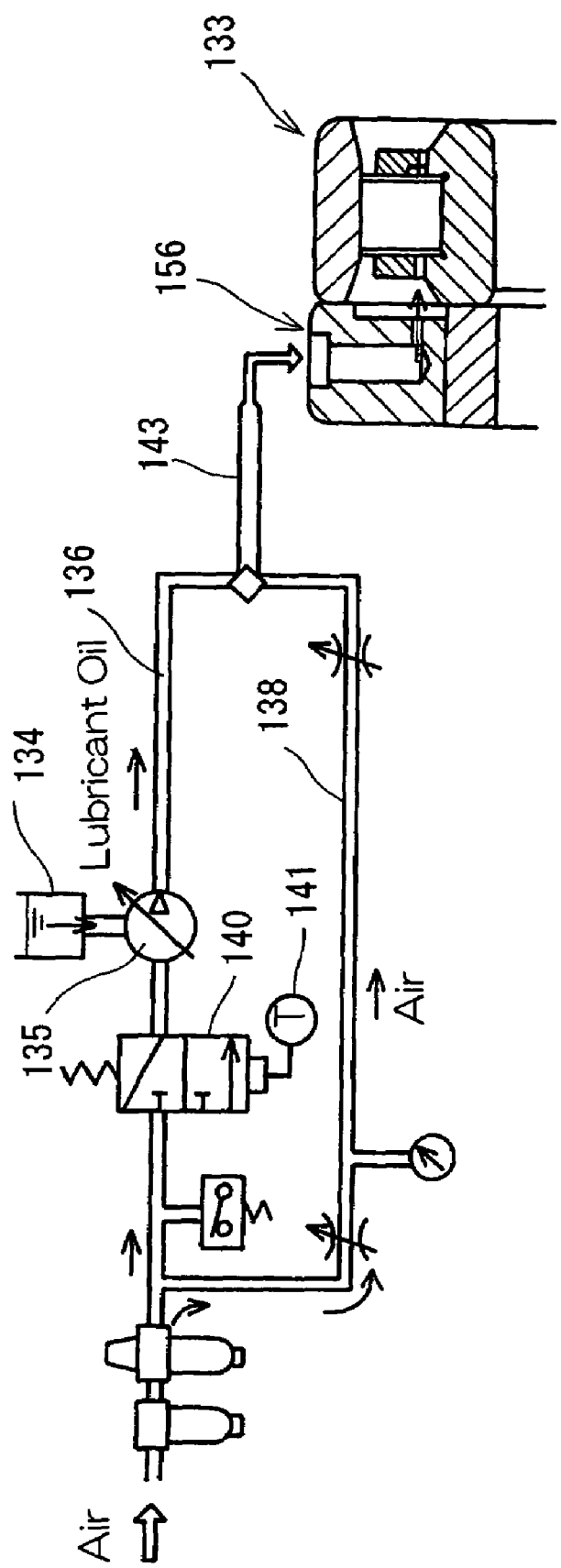
FIG. 8 is a schematic diagram showing a system used in connection with the conventional lubricating method for the rolling bearing assembly.

FIG. 4 illustrates a temperature rise occurring in the bearing outer race when a single row cylindrical roller bearing (N1020K, 100 mm in bearing inner diameter, 150 mm in bearing outer diameter) was lubricated with the air/oil mixture on a test basis. In the graph, in which the axis of abscissa represents the rotational speed and the axis of ordinate represents the bearing temperature, temperature data sampled are plotted. The air/oil lubrication is carried out by the use of the nozzle 156 of the structure shown in FIG. 8 and aimed at the raceway of the inner race. Test conditions are shown in Table 1. It is to be noted that the term "outer race temperature rise" stands for the outer race temperature from which the temperature of a machine bench of a testing apparatus is subtracted.

TABLE 1

| Bearing | Single-row Cylindrical Roller Bearing N1020K (100 mm in inner diameter & 150 mm in outer diameter) |
|---|---|
| Rotational Speed | 2,000~12,000 $min^{-1}$ |
| Inner Radial Gap After Mounting | +5 μm |
| Amt. of Air Supplied | 20 Nl/min |
| Amt. of Lubricant Oil Supplied | 0.02 ml/shot/5 min Interval |
| Lubricant Oil | Industrial Lubricant Oil ISO VG32 |
| Housing Cooling | Employed (Amt. of Coolant Oil: 8.0 l/min, Temp. of Oil: 30 ± 1° C.) |

In Table 1 above, the amount of the lubricant oil supplied (0.02 ml/shot/5 min interval) speaks that the air/oil mixture was jetted onto the bearing assembly in a quantity of 0.02 ml for each shot of supply at intervals of 5 minutes. This value was determined and chosen as the reliability can be secured at the maximum rotational speed of 1,200 $min^{-1}$ with this value.

In the graph of FIG. 4 showing a curve a, the maximum region in which the temperature rise is maximum exist between the rotational speeds of 4,000 $min^{-1}$ to 8,000 $min^{-1}$. In particular, the extremely maximum region can be found at the rotational speed of 4,000 $min^{-1}$ and 8,000 $min^{-1}$. This appears to have resulted from stirring drag of the lubricant oil discussed hereinbefore. Such a temperature rise of the bearing assembly 133 will, when applied to the spindle of the machine tool, result in not only reduction of the machining precision due to thermal expansion of the spindle, but also the possibility of the bearing assembly 133 being seized due to the excessive amount of the lubricant oil.

Figure 5:
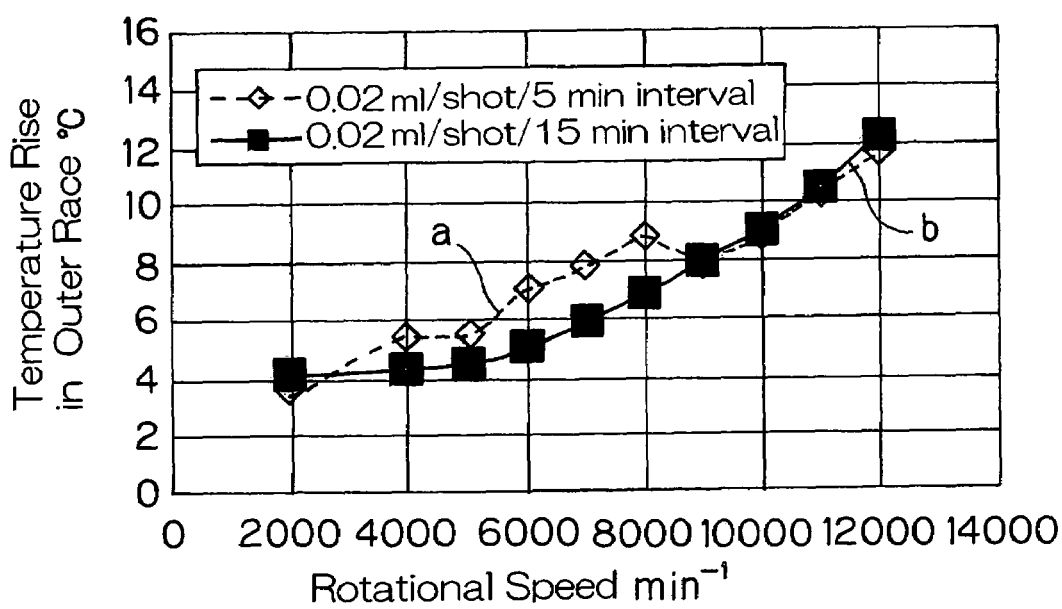
FIG. 5 is a graph showing a result of experiment conducted under a lubricating condition in which the amount of a lubricant oil is minimum.
Figure 6:
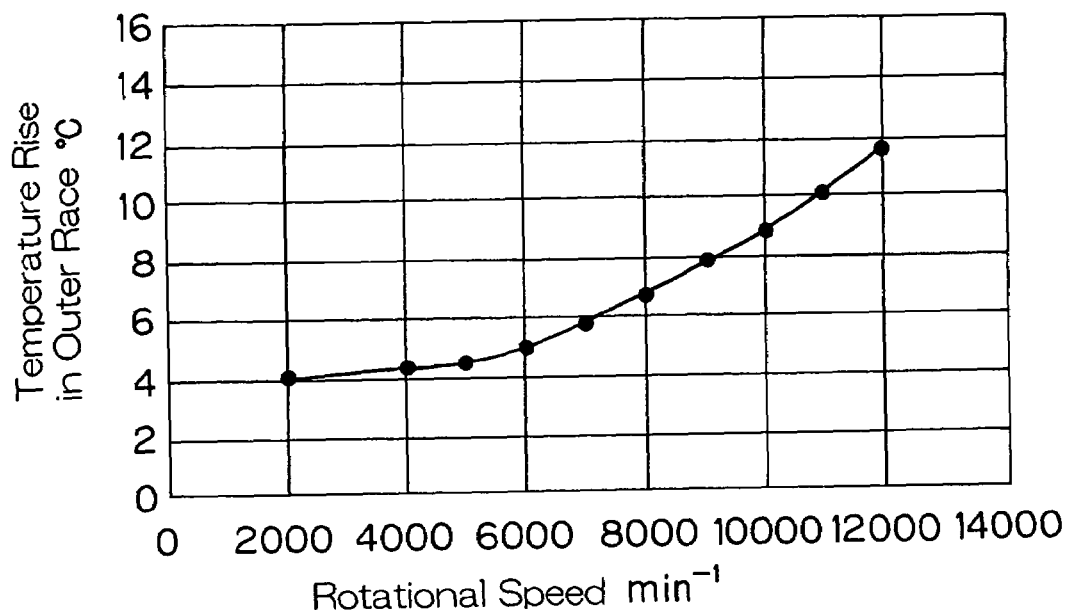
FIG. 6 is a graph showing the temperature rise under a lubricating condition in which the amount of a lubricant oil is changed during the operation of the rolling bearing assembly.
Figure 7:
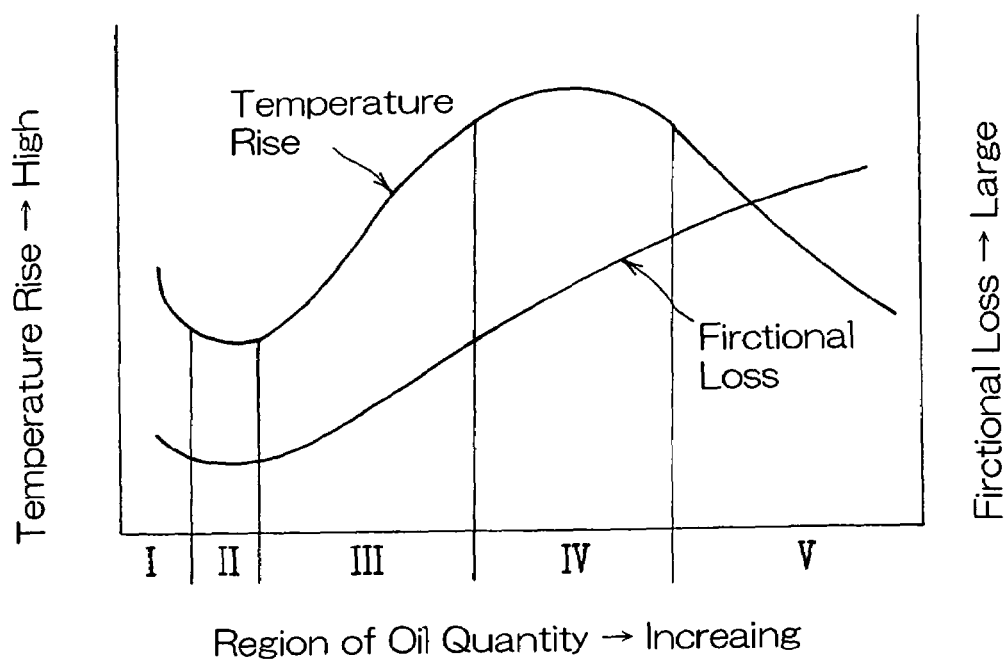
FIG. 7 is a graph showing the relationship among the amount of the lubricant oil, temperature rise and friction loss during lubrication of the rolling bearing assembly.

The graph of FIG. 5 showing a curve b (depicted along blackened square plots) represents the result of tests conducted under conditions similar to those shown in Table 1, except for only the amount of the lubricant oil reduced. Test conditions in this case are shown in Table 2:

TABLE 2

| Bearing | Single-row Cylindrical Roller Bearing N1020K (100 mm in inner diameter & 150 mm in outer diameter) |
|---|---|
| Rotational Speed | 2,000~12,000 $min^{-1}$ |
| Inner Radial Gap After Mounting | +5 μm |
| Amt. of Air Supplied | 20 Nl/min |
| Amt. of Lubricant Oil Supplied | 0.02 ml/shot/15 min Interval |
| Lubricant Oil | Industrial Lubricant Oil ISO VG32 |
| Housing Cooling | Employed (Amt. of Coolant Oil: 8.0 l/min, Temp. of Oil: 30 ± 1° C.) |

In the graph of FIG. 5 (curve b (0.02 ml/shot/15 min Interval), no maximum region of temperature rise such as found in the graph of FIG. 4 (0.02 ml/shot/5 min Interval) is found. This appears to have resulted from the fact that the stirring drag brought about by the excessive amount of the lubricant oil has decreased. On the other hand, in the case that the amount of the lubricant oil is supplied at 15-minute interval, the temperature rise is not reduced even though the amount of the lubricant oil supplied has been reduced as compared with the case that the lubricant oil is supplied at 5-minute interval. This accounts that the lubricating conditions can be found in the vicinity of the minimum point of the temperature rise shown in the region II of oil quantity. Because of this, there is a high possibility that the bearing temperature may abruptly increase when the lubricating conditions get worse by reason of, for example, troubles in the air/oil supply system or during acceleration or deceleration.

Summarizing the results shown respectively in FIGS. 4 and 5, the following may be stated. When the 5 minute intervals are employed, the sufficient amount of the lubricant oil can be secured even at a high speed although the maximum region occurs. At high speeds, the 5 minute intervals (with a large amount of the lubricant oil) has resulted in the lower bearing temperature than that brought about by the 15 minute intervals (with a small amount of the lubricant oil). This accounts that if the interval is longer than 5 minutes, the risk of seizing in the bearing increases. Conversely, since if the interval is shorter than 5 minutes and, at the same time, the amount of the lubricant oil is increased, the maximum region tends to spread on the side of high speed region and the speed region, in which the bearing assembly must be operated under the condition of the 15 minute interval (with a small amount of the lubricant oil) expands on the side of high speed region. Even in this case, the risk of seizing in the bearing if the lubricant oil is supplied at the 15 minute interval increases. With the 15 minute interval, no maximum region occurs within medium and low speed regions although the temperature rise at high speed region is considerable.

From the results of the tests shown in FIGS. 4 and 5, it can be expected that if the lubricating conditions are changed according to the rotational speed regions, the stable temperature rise can be exhibited while the reliability of lubrication is secured from the low speed rotation to the high speed rotation.

In view of the foregoing, in the illustrated embodiment, the graph of FIG. 4 (the curve a) is depicted in FIG. 5 as overlapped on the graph of FIG. 5 (the curve b) and, based on the overlapped graphs, the lubricating conditions are combined so that no maximum point of the temperature rise occurs substantially. By way of example, the supply adjusting unit 102 is so set that at the rotational speed lower than 10,000 min$^{-1}$, the interval of one shot per 15 minutes is chosen to reduce the amount of the lubricant oil supplied, but at the rotational speed equal to or higher than 10,000 min$^{-1}$, the interval is changed to the 5 minute interval to increase the amount of the lubricant oil supplied. In other words, the lubricating conditions shown in Table 3 are employed.

TABLE 3

| Bearing | Single-row Cylindrical Roller Bearing N1020K (100 mm in inner diameter & 150 mm in outer diameter) |
|---|---|
| Rotational Speed | 2,000~12,000 min$^{-1}$ |
| Inner Radial Gap After Mounting | +5 μm |
| Amt. of Air Supplied | 20 Nl/min |
| Amt. of Lubricant Oil Supplied | At 0 to 8,000 min$^{-1}$, 0.02 ml/shot/15 min Interval At 9,000 to 12,000 min$^{-1}$, 0.02 ml/shot/5 min Interval |
| Lubricant Oil | Industrial Lubricant Oil ISO VG32 |
| Housing Cooling | Employed (Amt. of Coolant Oil: 8.0 l/min, Temp. of Oil: 30 ± 1° C.) |

As described above, by monitoring the rotational speed during the operation of the bearing assembly and changing the amount of the lubricant oil in accordance with the rotational speed, the satisfactory lubrication was performed, in which the stable temperature rise was exhibited while the reliability of lubrication was secured.

The following is a summary of effects brought about by the embodiment hereinabove described.

The air/oil lubrication could be achieved, in which from the low speed rotation to the high speed rotation the stable temperature rise having no maximum region was exhibited.

It is possible not only to stabilize the temperature rise, but also to secure the reliability of lubrication, particularly that in the high speed region.

While, with the conventional supply system for supplying a non-variable amount of lubricant oil, the same amount of the lubricant oil has been supplied for the medium and low speed region as that in the high speed region, the embodiment described hereinbefore has successfully eliminated it. As a result thereof, the amount of the lubricant oil consumed in the medium and low speed regions could be reduced, the running cost of the lubricating device could be reduced and the environmental load could be reduced.

It is to be noted that although in the foregoing embodiment the two-stage adjusting scheme of the amount of lubricant oil has been described as employed, a multi-stage adjusting scheme or a stepless adjusting scheme can be employed depending on the scope of the rotational speed used.

An air/oil lubricating structure for the rolling bearing assembly according to a second preferred embodiment of the present invention will now be described with reference to FIGS. 9 to 13. A rolling bearing assembly 1 is of a structure, in which a plurality of rolling elements 4 are rollingly positioned between respective raceways 2a and 3a formed in an inner race 2 and an outer race 3. The inner race 2 and the outer race 3 have the same width. Each of the rolling elements 4 is in the form of, for example, a ball and is retained in position within a corresponding pocket defined in the retainer 5. An outer peripheral surface of the inner race 2 of the rolling bearing assembly 1 is formed with an inclined surface area 2b continued from the raceway 2a and a nozzle member 6 is disposed adjacent the inclined surface area 2b with a gap δ (FIG. 9) formed therebetween. The inclined surface area 2b is formed on a portion of the outer peripheral surface of the inner race 2 (on one side of the inner race 2 adjacent a rear side of the bearing assembly 1 where no load is imposed) between the raceway 2a and an end face of the inner race 2. Although the inclined surface area 2b is continued substantially directly to the raceway 2a, a cylindrical surface area of a cylindrical portion may intervene between the inclined surface area 2b and the raceway 2a. Where the rolling bearing assembly 1 is an angular ball bearing, the inclined surface area 2b is represented by a portion of the outer peripheral surface of the inner race 2 where a counter-bore is formed.

The nozzle member 6 has its tip 6aa positioned in alignment with a portion of each rolling element 4 delimited between an inner peripheral surface of the retainer 5 and the outer peripheral surface of the inner race 2. This nozzle member 6 is in the form of a ring-shaped member and has a collar 6a that is positioned axially adjacent the rolling bearing assembly 1 and extends from an inner peripheral portion of a side face of the nozzle member 6 in a direction axially of the nozzle member 6. This collar 6a has an inner peripheral surface inclined at the same angle as the angle of inclination of the inclined surface area 2b in the inner race 2 and extends to a position immediately beneath the retainer 5 with its annular free end defining the nozzle tip 6aa of the nozzle member 6. A gap δ delimited between the collar 6a of the nozzle member 6 and the inclined surface area 2b in the inner race 2 is chosen in consideration of the engagement of the shaft with the inner race 2 and/or the expansion of the inner race 2 resulting from the temperature rise and the centrifugal force and is generally chosen to be of a value as small as possible so that during the operation no contact takes place between the nozzle member 6 and the inner race 2.

The nozzle member 6 includes an air/oil discharge groove 7 opening towards the inclined surface area 2b of the inner race 2 and a discharge passage 8 having a discharge port 8a open at the discharge groove 7. The discharge groove 7 extends circumferentially and is formed in an annular shape. The discharge passage 8 is formed at one location or a plurality of locations in the circumferential direction of the nozzle member 6. The discharge passages 8 are so designed that the respective discharge ports 8a are oriented towards the inclined surface area 2b so that the air/oil mixture emerging outwardly from the nozzle member 6 can be jetted directly onto the inclined surface area 2b of the inner race 2, with the direction of discharge from the discharge ports 8a inclined at an angle β relative to the inclined surface area 2b. The discharge groove 7 has such a sectional shape that it will not hamper a direct spraying of the lubricant oil from the discharge ports 8 towards the inclined surface area 2b.

For the purpose that the lubricant oil jetted from the discharge ports 8 of the nozzle member 6 towards the inclined surface area 2b of the inner race 2 can be efficiently supplied internally of the rolling bearing assembly 1 through the inclined surface area 2b, the minimum value of the angle of inclination α of the inclined surface area 2b is so chosen as to satisfy the following formula:

$$\alpha \geq 0.0667 \times dn10^{-4} - 1.8333$$

wherein dn represents the product of the inner diameter (mm) of the bearing assembly multiplied by the rotational speed (min$^{-1}$).

According to the foregoing formula, in the case where the rolling bearing assembly 1 is an angular ball bearing having a bearing inner diameter of 70 mm and a rotational speed of 30,000 min$^{-1}$, the angle of inclination α of the inclined surface area 2b of the inner race 2 is equal to or greater than 12.8°.

On the other hand, the maximum value of the angle of inclination α of the inclined surface area 2b of the inner race 2 is preferred to be equal to or smaller than 25° in the case of the angular ball bearing. In the case of the angular ball bearing, if the inclination angle α exceeds 25°, the radial width of one end face of the inner race 2 adjacent the inclined surface area 2b will be excessively small to such an extent that the surface area of contact between it and an inner race spacer 11 or a housing adjoining that end face of the inner race 2 would be considerably reduced, with the rolling bearing assembly consequently failing to support a relatively large axial load.

The preferred maximum value of the angle of inclination α of the inclined surface area of the inner race varies depending on the type of the bearing assembly and is preferably equal to or smaller than 35° in the case of the cylindrical roller bearing with the inner race having the collar. Also, in the case of the cylindrical roller bearing with the inner race having the collar, the minimum value of the inclination angle α is preferably equal to or greater than 25°. In other words, in the case of the cylindrical roller bearing with the inner race having the collar, the inclination angle α is preferably chosen to be within the range of 25 to 35° by the following reason.

In the case of the cylindrical roller bearing, if the inclination angle α is chosen to be equal to or greater than 25°, the tip of the nozzle member can easily be positioned beneath the annular portion of the retainer. On the other hand, in the case of the cylindrical roller bearing with its inner race having the collar, if the inclination angle α exceeds 35°, the radial width of the end face of the inner race, where the inclined surface area is defined, will become small, resulting in decrease of the surface area of contact between that end face and the inner race spacer or housing, with the bearing consequently failing to support a relatively large axial load.

In the case of each of the cylindrical roller bearings with their inner race having the collar as will be discussed later, the inclination angle α in all of those bearings is chosen to be within the range of 25 to 35°.

Figure 9A:
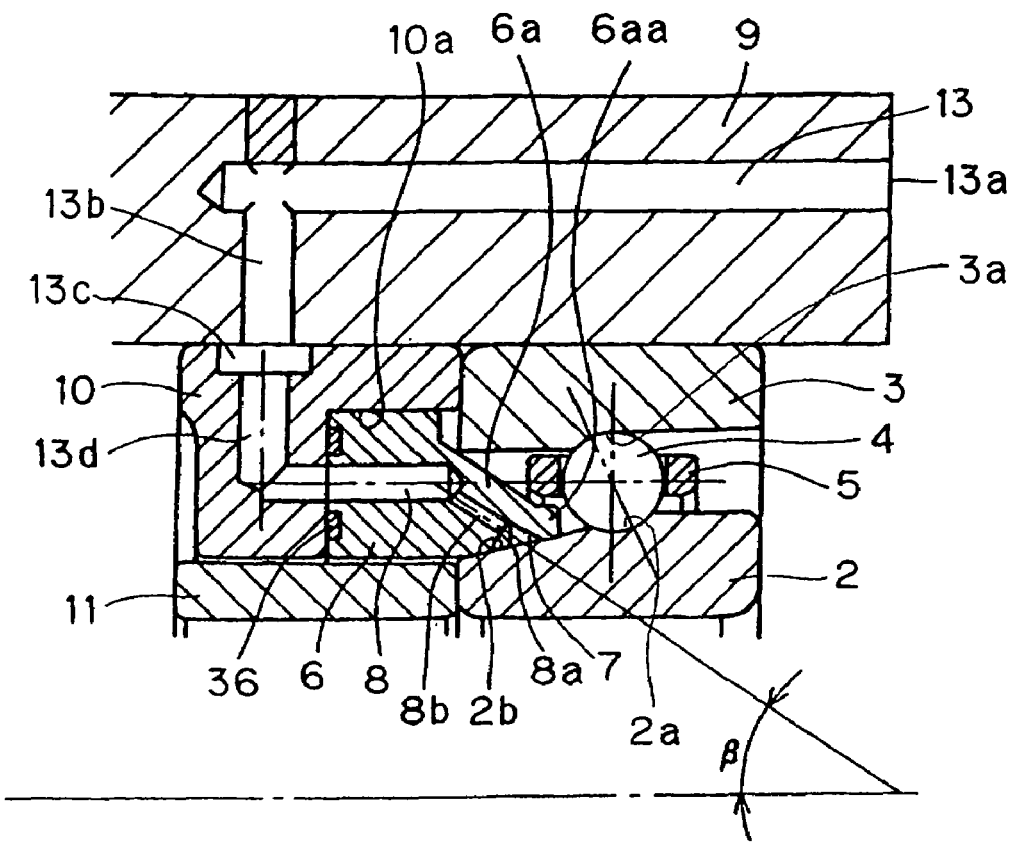
FIG. 9A is a sectional view of an air/oil lubricating structure for the rolling bearing assembly according to a second preferred embodiment of the present invention.
Figure 9B:
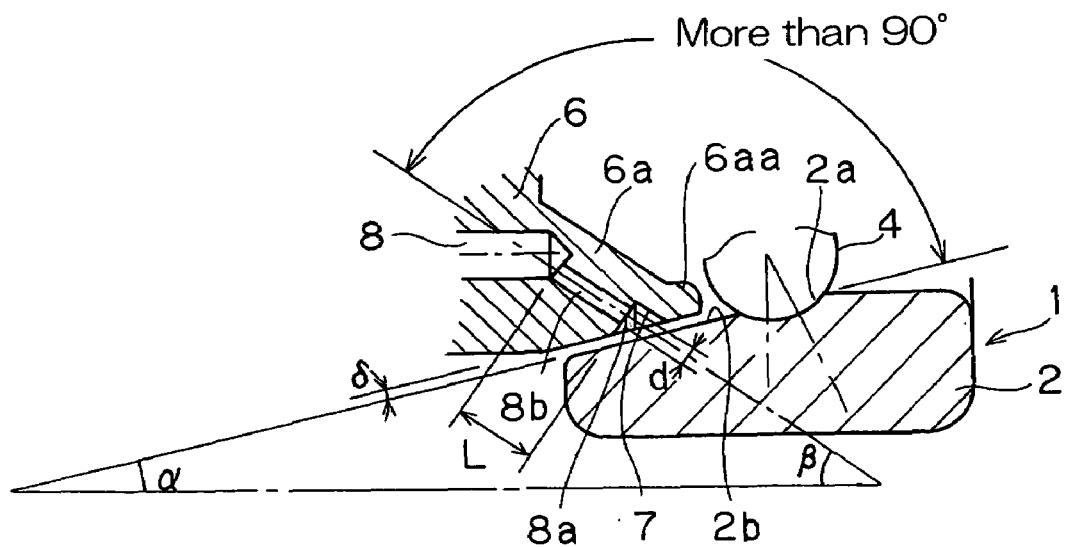
FIG. 9B is a fragmentary enlarged view of FIG. 9A.

The relation between the angle of inclination α of the inclined surface area 2b of the inner race 2 and the angle of discharge β, which is the angle formed by the direction of discharge of the air/oil mixture from the discharge ports 8a relative to the axial direction is chosen to be α<90°−β as shown in FIG. 9B. In other words, the angle of inclination α of the inclined surface area 2b is so chosen that the angle delimited between the direction of discharge of the air/oil mixture and the inclined surface area 2b can be greater than 90°.

It is to be noted that, in order for the lubricant oil, jetted towards the inclined surface area 2b of the inner race 2, to be efficiently supplied internally of the rolling bearing assembly 1 through the inclined surface area 2b, the surface roughness of the inclined surface area 2b is preferably minimized by means of a grinding technique or a lapping technique. In the example now under discussion, the surface roughness Ra thereof is chosen to be equal to or smaller than 1.0.

Each of the discharge ports 8a of the discharge passages 8 has an opening diameter d within the range of about 0.8 to 1.2 mm and a portion 8b neighboring the respective discharge port 8a has the length L set to be twice the opening diameter d or more, so that the speed of spraying of the air/oil mixture will not be lowered.

The nozzle member 6 is fitted to a housing 9 that carries the outer race 3 of the bearing assembly 1. Mounting of the nozzle member 6 to the housing 9 may be carried out by means of an outer race spacer 10 or direct mounting of the nozzle member 6 to the housing 9 may be carried out. In the example shown in FIG. 9A, the outer race spacer 10 is used to secure the nozzle member 6 therethrough to the housing 9 and the nozzle member 6 is nested within an annular cutout recess y formed in an inner peripheral portion of the outer race spacer 10 so as to face the bearing assembly 1. A portion of the inner peripheral surface of the nozzle member 6 outside the bearing is positioned close to the inner race spacer 11 but spaced a distance to the extent that the portion does not come in contact with the inner race spacer 11.

A sealing member 36 such as an O-ring is provided in a circumferential groove defined adjacent an inlet of the discharge passage 8 in the nozzle member 6, and the outer race spacer 10 and the nozzle member 6 are fastened together by means of one or more fastening element (not show) such as bolts, to avoid any possible leakage of the air/oil mixture outwardly from a connecting portion between the air/oil supply passage 13 and the discharge passage 8.

The discharge passage 8 within the nozzle member 6 is designed such that the neighboring portion 8b of the discharge port 8a is formed as having a restriction hole of a diameter smaller than that of a general portion of the discharge passage 8. The inlet of the discharge passage 8 is communicated with the air/oil supply passage 13 defined so as to extend from the housing 9 to the nozzle member 6. The air/oil supply passage 13 has an air/oil supply port 13a, defined in the housing 9, and a housing-side outlet 13b defined in an inner surface of the housing 9. The housing-side outlet 13b is communicated with an annular communicating groove 13c defined in an outer peripheral surface of the outer race spacer 10, which is in turn communicated with the discharge passages 8 in the nozzle member 6 through respective routing passages 13d extending radially inwardly from the annular communicating groove 13c. The air/oil supply port 13a is fluid connected with a source of supply (not shown) of the air/oil mixture, which is a mixture of the lubricant oil with a compressed carrier air.

The operation of the air/oil lubricating structure described hereinabove will now be described. The air/oil mixture supplied from the air/oil supply port 13a shown in FIG. 9A is jetted onto the inclined surface area 2b of the inner race 2 through the discharge passages 8 in the nozzle member 6. The air/oil mixture so jetted towards the inclined surface area 2b contributes to lubrication of the bearing assembly 1 in the following manners.

(1) The air/oil mixture flows directly into the interior of the bearing assembly 1 through the gap between the inclined surface area 2b and the nozzle member 6 by the effect of a jetting force.

(2) The lubricant oil deposited on the inclined surface area 2b of the inner race 2 flows into the interior of the bearing assembly 1 by the effect of the surface tension of the lubricant oil and a component of the centrifugal force acting in a direction towards a large diameter portion of the inclined surface area 2b.

(3) The air/oil mixture remaining within the circumferentially extending annular discharge groove 7 flows towards the interior of the bearing assembly 1 by the effect of a negative pressure induced suction occurring in the gap between the inclined surface area 2b and the nozzle member 6 and subsequently flows from the tip 6aa of the nozzle member 6 by the effect of the centrifugal force to deposit on the inner peripheral surface of the retainer 7 or the rolling elements 4 to act as a lubricating oil for various parts of the bearing assembly.

As described above, since the air/oil mixture is supplied onto the inclined surface area 2b of the inner race 2, but is not directly jetted onto the raceway for the rolling elements 4, no generation of wind noises resulting from revolution of the rolling element 4 occurs, resulting in reduction of the noise level. Also, since the supply of the lubricant oil is not effected by means of jetting of air, but the air/oil mixture supplied onto the inclined surface area 2b of the inner race 2 is guided inwardly of the bearing assembly 1 by the effect of rotation of the inner race 2, the air used merely serves to transport the lubricant oil to the inclined surface area 2b and, therefore, the amount of the air used can be reduced. Because of this, energy saving effects can be appreciated as a result of reduction of the amount of the air used.

Also, in the illustrated embodiment, since the air/oil mixture is jetted directly onto the inclined surface area 2b, the lubricant oil can easily deposit on the inclined surface area 2b and, also by the action of the jetting force, the air/oil mixture can flow inwardly of the bearing assembly. The angle of inclination α of the direction of discharge from the discharge passage 8 is chosen to be within such a range that the air blown off from the discharge passage 8 can be jetted directly onto the inclined surface area 2b of the inner race 2 and the concomitant jet flow would not considerably promote the wind sounds resulting from revolution of the rolling elements 4. By so constructing, the air/oil mixture can easily flow inwardly of the bearing assembly and the supply of the lubricant oil onto the area of contact between the inner race 2 and the rolling elements 4 can be facilitated. Also, since the discharge ports 8a, which define the respective outlets of the discharge passages 8, has a small diameter, the velocity of flow of the air/oil mixture can be increased accompanied by reduction of the temperature of the discharged air. This air of the reduced temperature is jetted a small distance onto the inner race 2 and, therefore, lowering of the inner race temperature can be expected.

In particular, in the air/oil lubricating structure so constructed as hereinabove described, since the angle of inclination α of the inclined surface area 2b relative to the axial direction of the rolling bearing is so chosen as to fall within the previously described range, the following effects can be obtained. With respect to the minimum value of the inclination angle α, those effects have been affirmed by a series of experiments conducted in the manner as will be described later.

More specifically, since the minimum value of the inclination angle α is so chosen as to be equal to or greater than $(0.0667 \times d \times 10^{-4} - 1.8333)$, the lubricant oil can assuredly reach the raceway in the inner race without being separated halfway from the inclined surface area 2b under the influence of the centrifugal force. Accordingly, lubrication can efficiently be performed with a minimum required amount of the lubricant oil and the temperature rise can advantageously be suppressed while the lubrication is performed assuredly. As such, the resistance to seizure of the rolling bearing can be increased, and the rolling bearing can be operated at a higher speed. Even the air can be consumed in a minimum required amount and, therefore, the energy consumption can be suppressed, allowing the noises to be further reduced.

The relation between the angle of inclination α of the inclined surface area 2b and the discharge angle β is so determined that the angle formed between the direction of discharge of the air/oil mixture and the inclined surface area 2b may be equal to or greater than 90°, that is, α<90°−β, the air/oil mixture jetted from the discharge ports 8a can, even though colliding against the inclined surface area 2b of the inner race 2, flow under the influence of the centrifugal force and with no resistance imposed thereon.

Figure 10A:
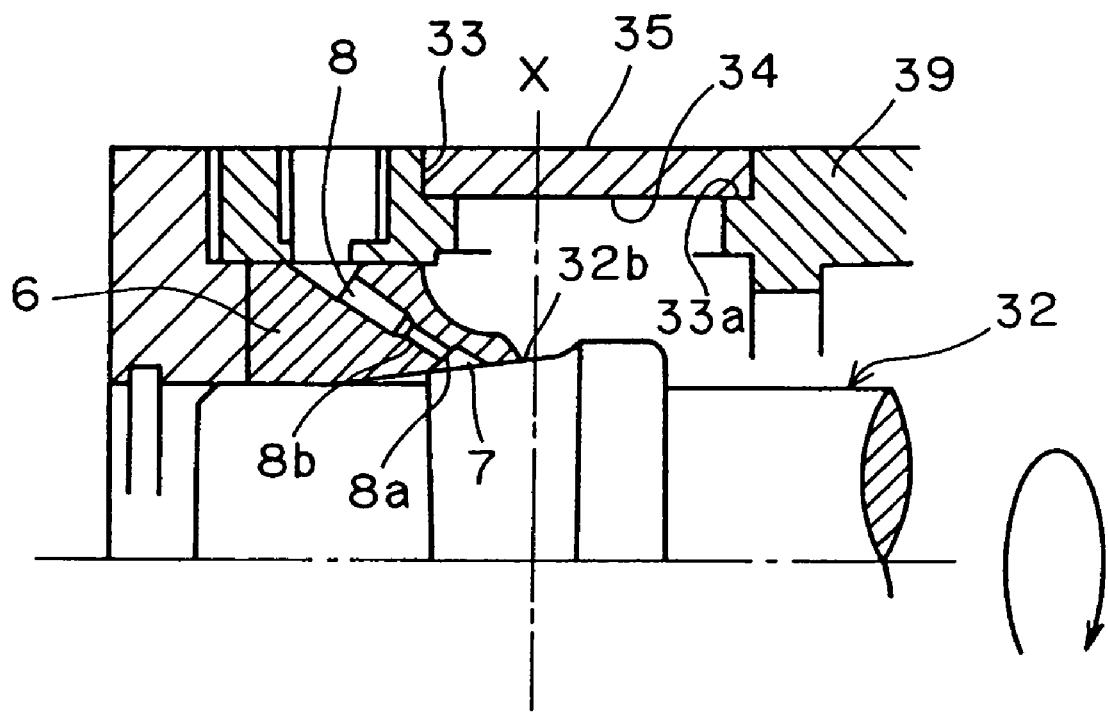
FIG. 10A is a sectional view of a test equipment used during a verification test conducted to ascertain the optimum angle of inclination of an inclined surface area formed in an inner race in the air/oil lubricating structure.
Figure 10B:
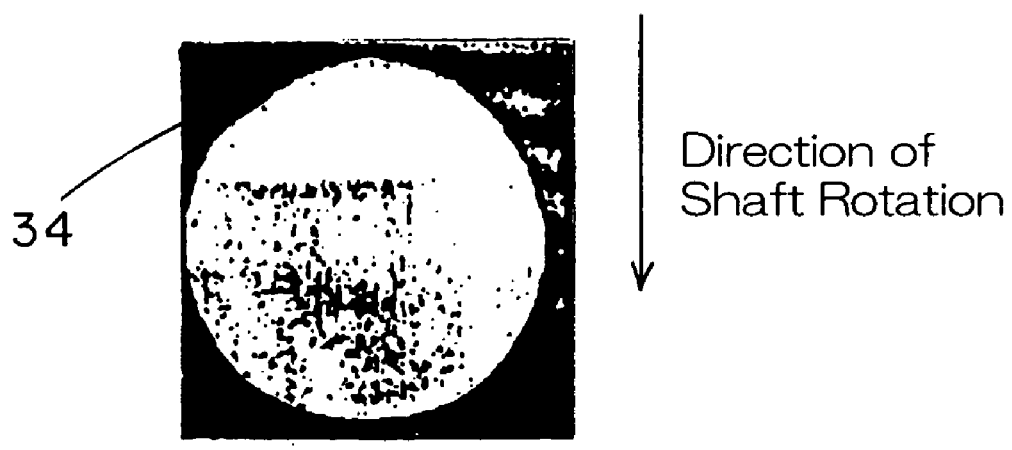
FIG. 10B is a plan view of a check paper used during the verification test to ascertain deposition of oil.
Figure 11:
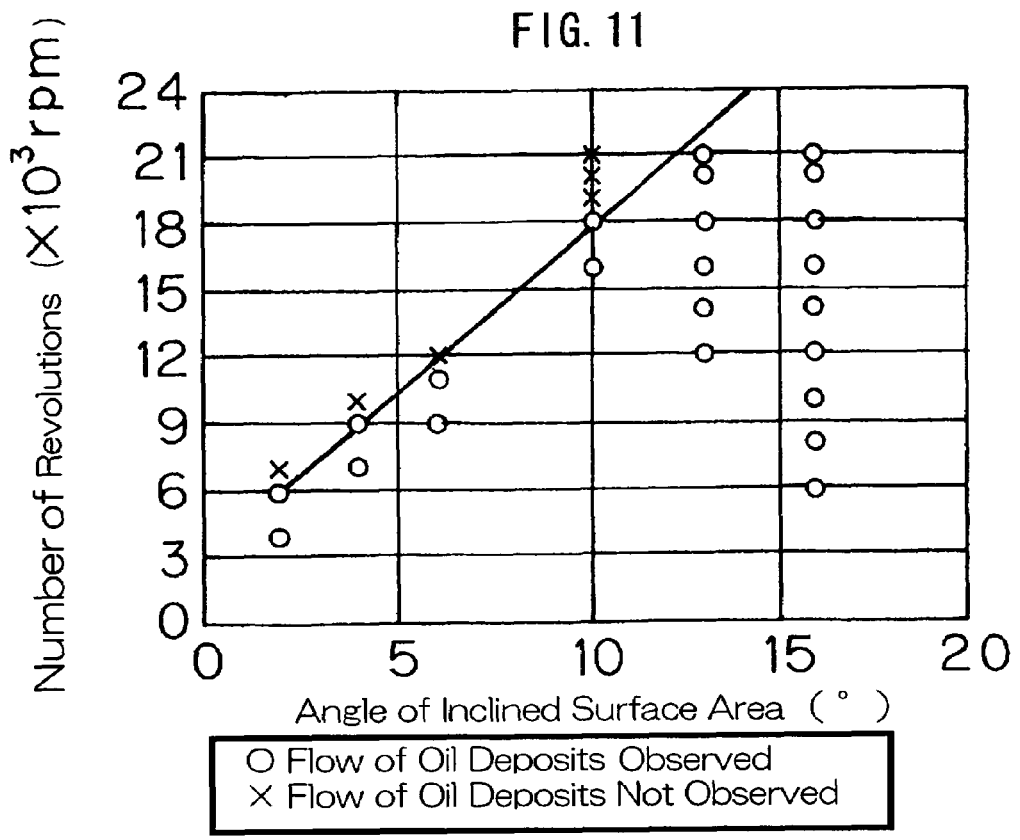
FIG. 11 is a graph showing first results of the verification test conducted to ascertain the optimum inclination angle.
Figure 12:
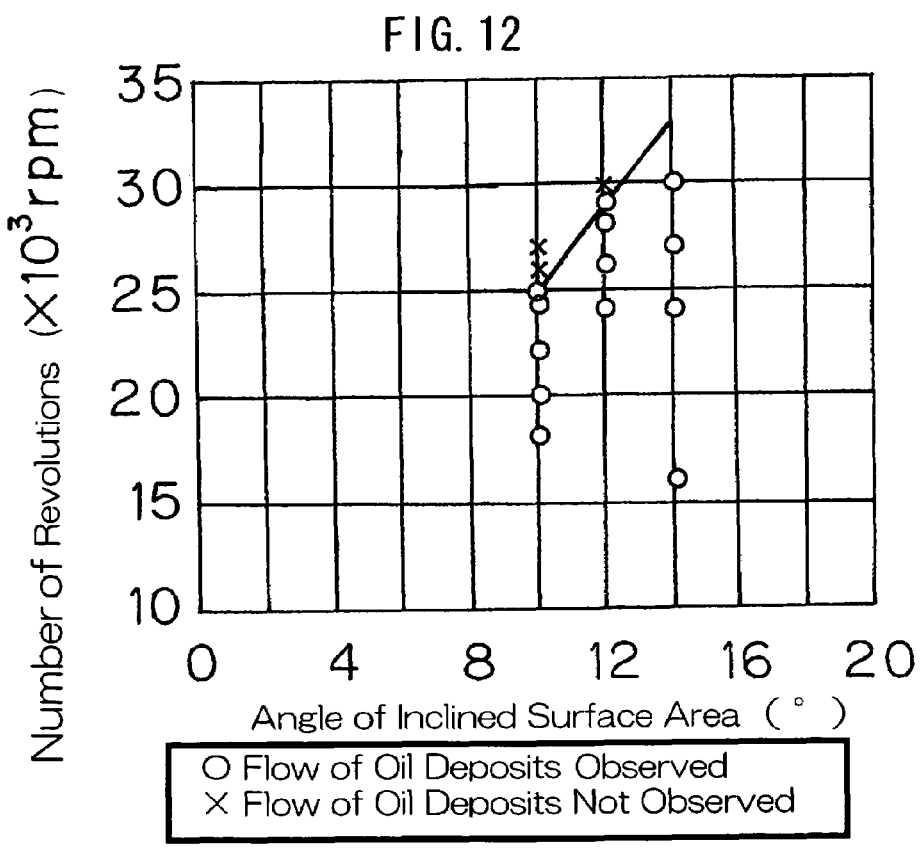
FIG. 12 is a graph showing second results of the verification test conducted to ascertain the optimum inclination angle.
Figure 13:
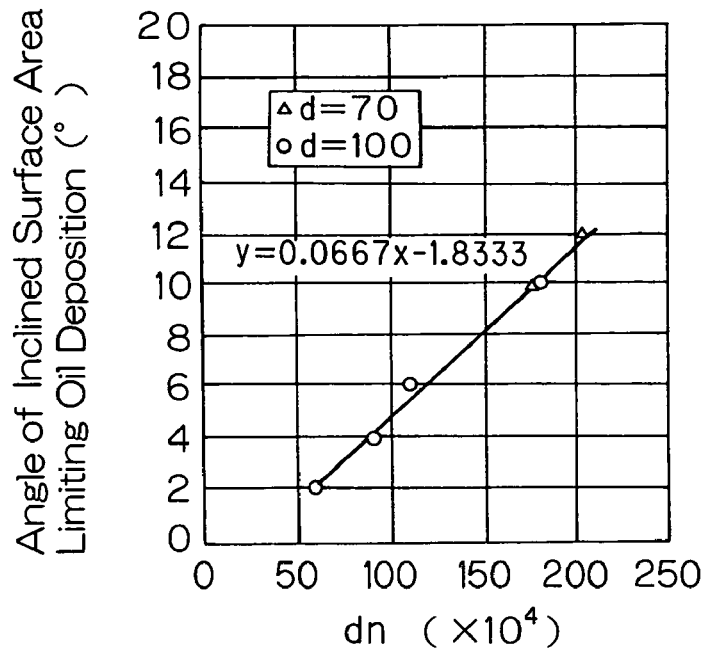
FIG. 13 is a graph showing third results of the verification test conducted to ascertain the optimum inclination angle.

FIGS. 10A and 10B illustrates an example of a verification test conducted to ascertain the appropriate value of the angle of inclination α of the inclined surface area 2b of the inner race 2 in the air/oil lubricating structure according to the previously described embodiment. For the verification test, in place of the inclined surface area 2b of the inner race 2, a test shaft 32 having an outer peripheral surface formed with an inclined surface area 32b is used as a test equipment and a nozzle member 6, which is an equivalent of that employed in the previously described embodiment, is disposed in face-to-face relation with the inclined surface area 32b with a gap δ defined therebetween as shown in FIG. 10A. Also, a housing 39 radially outwardly of the inclined surface area 32b of the test shaft 32 is formed with a round opening 33 in alignment with the inclined surface area 32b, and an acrylic plate 35 having an oil deposit check paper 34 applied to a rear side thereof is seated on a circumferentially extending step 33a of the round opening 33.

In this verification test, the appropriateness of the inclination angle α is determined by jetting the air/oil mixture from the discharge ports 8a in the nozzle member 6 while the test shaft 32 of the test equipment is rotated, and by then determining the presence or absence of a trace of flow of the oil deposited on the inclined surface area 32b in reference to the pattern of scattering of the oil deposited on the oil deposit check paper 34. FIG. 10B illustrates an example of the pattern of scattering of the oil deposited on the oil deposit check paper 34. Specifically, if the oil deposit check paper 34 shows that scatterings of the oil are concentrated on a right-hand portion of the paper 34 (i.e., a large diameter portion of the test shaft 32) with respect to the position X of the maximum diameter of the inclined surface area 32b of the test shaft 32, the trace of flow of the oil deposit is deemed as observed, but if the oil deposit check paper 34 shows that the scatterings of the oil are deposited on a left-hand portion of the paper 34 or over the entire paper 34, the trace of flow of the oil deposit is deemed as not observed.

The verification test was carried out under the following preset conditions as tabulated in Table 4. Results of the verification test are shown in respective graphs of FIGS. 11 to 13.

TABLE 4

| Items | Inner Diameter d = 100 mm | Inner Diameter d = 80 mm |
|---|---|---|
| 1. Nozzle Diameter | φ1.2 | φ0.8 |
| 2. Inclination Angle α | 2 to 16° | 10, 12, 14° |
| 3. Gap δ | 0.16 to 1.0 mm | 0.1 to 0.3 mm |
| 4. Air/Oil Mixture | | |
| Amt. of Air (Nl/min) | 20 | 10 to 20 |
| Amt. of Oil (ml/Oiling Interval) | 0.01 ml/5 min | 0.01 ml/5 min |
| 5. Oil Fluidity (mm/s$^2$) | 10, 32, 68 | 32 |
| 6. Rotational Speed min$^{-1}$ | Max 21,000 | Max 30,000 |

From the results of the verification test, it may be concluded that the gap δ between the inclined surface area 2b of the inner race 2 and the nozzle member 6 and the fluidity of the oil would not affect the flow of the oil deposit so much. Also, the angle of inclination α of the inclined surface area 2b, which is required for the oil, discharged from the discharge ports 8a of the nozzle member 6, to be delivered to the raceway 2a without being separated from the inclined surface area 2b of the inner race 2 by the effect of the centrifugal force, is expressed by the following formula as hereinbefore described.

$$\alpha \geq 0.0667 \times dn \times 10^{-4} - 1.8333$$

wherein dn represents the product of the inner diameter (mm) of the bearing assembly multiplied by the rotational speed (min$^{-1}$).

In the embodiment, in which the angle of inclination α of the inclined surface area 2b of the inner race 2 is determined such as hereinbefore described, there is no possibility that the oil discharged from the discharge ports 8a of the nozzle member 6 can be supplied onto the raceway 2a without being separated from the inclined surface area 2b of the inner race 2 by the effect of the centrifugal force and, accordingly, the lubricant oil can efficiently be transported to the raceway 2a in the inner race 2 of the rolling bearing assembly 1.

Figure 14:
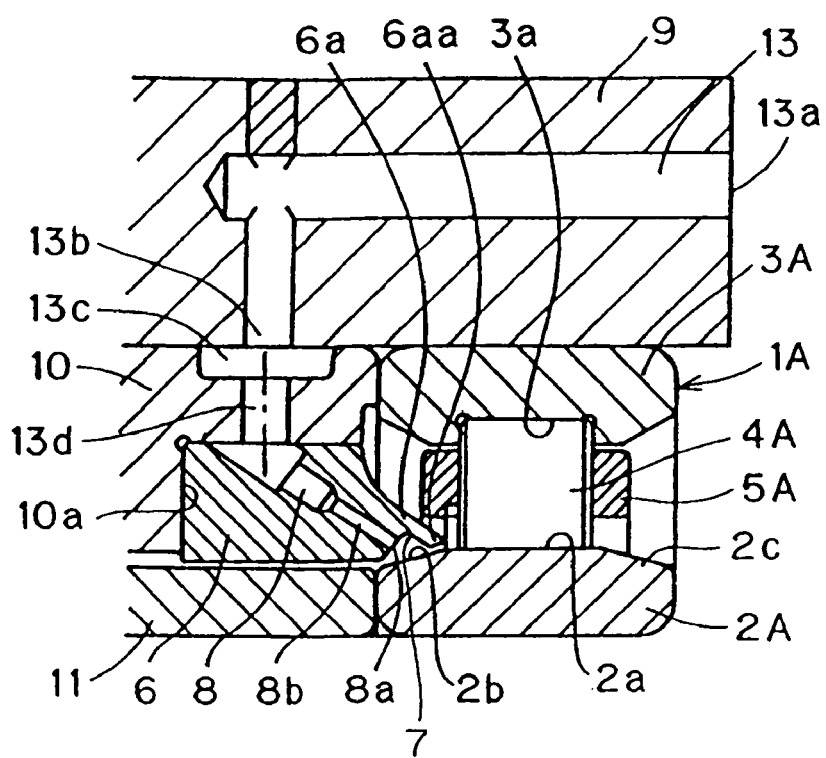
FIG. 14 is a sectional view of an air/oil lubricating structure according to a third preferred embodiment of the present invention.

FIG. 14 illustrates an air/oil lubricating structure for the rolling bearing assembly according to a third preferred embodiment of the present invention. The air/oil lubricating structure shown in FIG. 14 is substantially similar to that shown in and described with reference to FIG. 9A in connection with the first embodiment of the present invention, except that in the embodiment of FIG. 14 the rolling bearing assembly 1 is replaced with a cylindrical roller bearing 1A. The cylindrical roller bearing 1A includes an outer race 3A formed with collars at its opposite ends, an inner race 2A having no collar formed therein, and a plurality of rolling elements 4A in the form of cylindrical rollers intervening between respective raceways 2a and 3a of the inner and outer races 2A and 3A. Each of the rolling elements 4A is rollingly retained by a retainer 5A. The retainer 5A is of a type including a cylindrical member formed with a plurality of pockets each positioned in a portion thereof intermediate of the axial length thereof, i.e., of a so-called cage type or ladder type. Opposite portions of the raceway 2a in an outer peripheral surface of the inner race 2A are formed with respective inclined surface areas 2b and 2c in continuance with the raceway 2a. The nozzle member 6 includes the discharge passages 8 and the discharge groove 7 of the same construction as those shown in FIG. 9A, and the discharge ports 8a of the discharge passages 8, which open towards the discharge groove 7, are oriented towards the inclined surface area 2b so that the air/oil mixture discharged can be jetted directly onto the inclined surface area 2b of the inner race 2A, and have the discharge direction inclined at an angle of inclination β (FIG. 9A) relative to the inclined surface area 2b.

The inclined surface areas 2b and 2c on both sides of the raceway 2a of the inner race 2 are similar to tapered surfaces formed on an outer peripheral surface of an inner race that are generally employed in the cylindrical roller bearing including a collarless inner race. Those tapered surfaces are employed as the inclined surface area 2b for the supply of the air/oil mixture. For this reason, there is no need to form the inclined surface area 2b solely for the supply of the air/oil mixture.

In the embodiment shown in FIG. 14, a large diameter portion of the inclined surface area 2b of the inner race 2A is positioned closer to the raceway 2a than to an end face of the retainer 5A adjacent the nozzle member 6. In this way, the lubricant oil flowing towards the raceway 2a through the inclined surface area 2b of the inner race 2 can be guided smoothly into the interior of the bearing assembly 1A without being interrupted by the end face of the retainer 5A.

Other structural features and effects brought about thereby are substantially similar to those shown in and described with particular reference to FIGS. 9A and 9B in connection with the first embodiment of the present invention. In this third embodiment, the range of the inclination angle α is identical with that shown and described in connection with the first embodiment of the present invention. In each of the subsequently described embodiments of the present invention, the range of the inclination angle α are identical with that shown and described in connection with the first embodiment of the present invention.

Figure 15A:
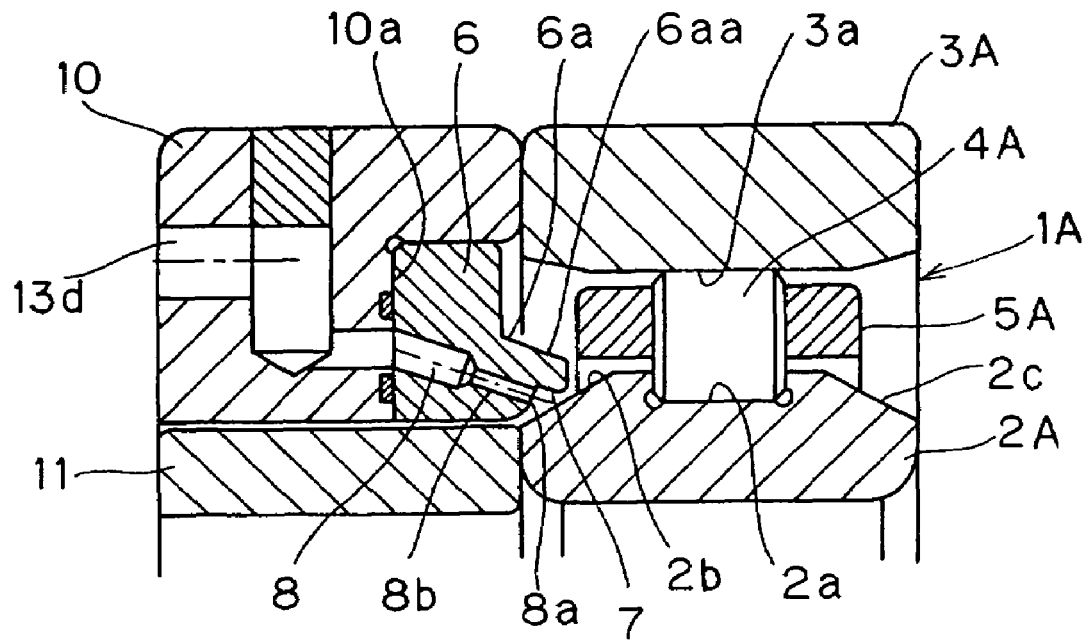
FIG. 15A is a sectional view of an air/oil lubricating structure according to a fourth preferred embodiment of the present invention.

FIG. 15A illustrates an air/oil lubricating structure for the rolling bearing assembly according to a fourth preferred embodiment of the present invention. The air/oil lubricating structure shown in FIG. 15A is substantially similar to that shown in and described with particular reference to FIGS. 9A and 9B in connection with the first embodiment of the present invention, except that in the embodiment of FIG. 15A the rolling bearing assembly 1 is replaced with a cylindrical roller bearing 1A. The cylindrical roller bearing 1A includes a collarless outer race 3A, an inner race 2A formed with collars at its opposite ends, and a plurality of rolling elements 4A in the form of cylindrical rollers intervening between respective raceways 2a and 3a of the inner and outer races 2A and 3A. Each of the rolling elements is rollingly retained by a retainer 5A. Opposite portions of the raceway 2a in an outer peripheral surface of the inner race 2A, that is, outer peripheral surfaces of the collars of the inner race 2A are formed with respective inclined surface areas 2b and 2c in continuance with the raceway 2a. Although the inclined surface areas 2b and 2c are continued to the raceway 2a through cylindrical surface areas and inner surfaces of the collars, the inclined surface areas 2b and 2c may be directly continued to the inner surfaces of the collars on respective sides of the raceway 2a with the cylindrical surface areas eliminated.

The nozzle member 6 includes the discharge passages 8 and the discharge groove 7 of the same construction as those shown in FIG. 9A, and the discharge ports 8a of the discharge passages 8, which open towards the discharge groove 7, are oriented towards the inclined surface area 2b so that the air/oil mixture discharged can be jetted directly onto the inclined surface area 2b of the inner race 2A and have the discharge direction inclined at an angle of inclination β (FIGS. 9A and 9B) relative to the inclined surface area 2b. While the air/oil supply passage 13d defined in the outer race spacer 10 extends axially, it is finally communicated with the air/oil supply port 13a in the housing 9 (FIG. 9A). In a manner similar to the embodiment shown in FIG. 14, a large diameter portion of the inclined surface area 2b of the inner race 2A is positioned closer to the raceway 2a than to the end face of the retainer 5A adjacent the nozzle member 6.

In the embodiment shown in FIG. 15A, the nozzle member 6 may have its tip 6aa plunged radially inwardly of the retainer 5A. If the tip 6aa of the nozzle member 6 is plunged radially inwardly of the retainer 5A, the lubricant oil flowing towards the raceway 2a along the inclined surface area 2b of the inner race 2A can be received within an inner diameter portion of the retainer 5A even though separated radially outwardly away from the inclined surface area 2b at a location adjacent the tip 6aa of the nozzle member 6 under the influence of the centrifugal force, thus contributing to lubrication.

Figure 16:
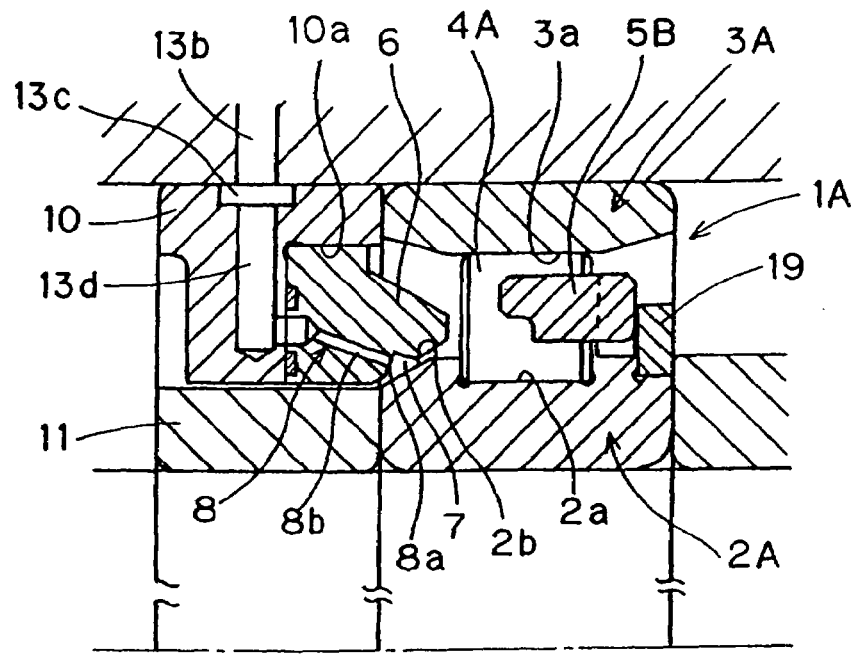
FIG. 16 is a sectional view of an air/oil lubricating structure according to a fifth preferred embodiment of the present invention.
Figure 17:
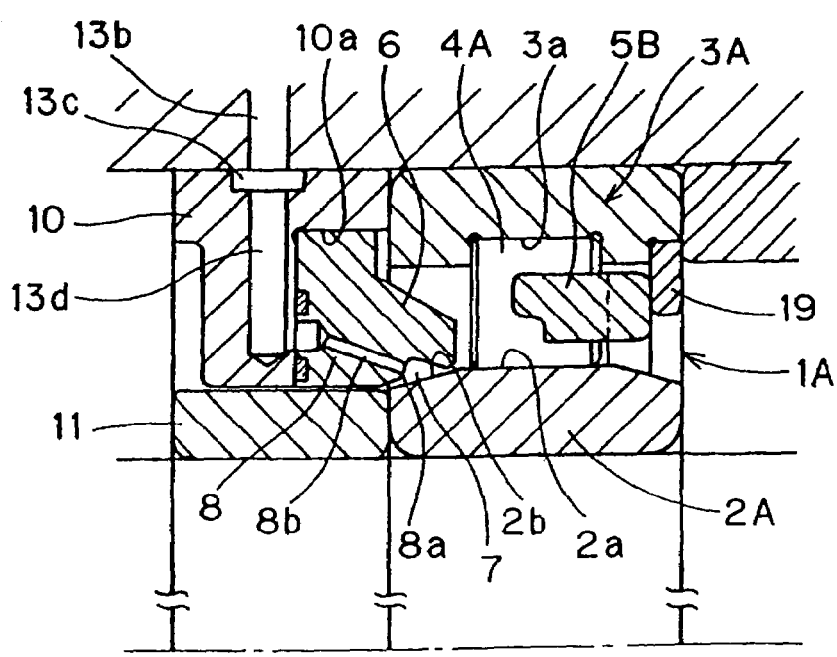
FIG. 17 is a sectional view of an air/oil lubricating structure according to a sixth preferred embodiment of the present invention.

FIGS. 16 and 17 illustrate air/oil lubricating structures for the rolling bearing assembly according to fifth and sixth preferred embodiments of the present invention, respectively. Those embodiments are substantially similar to the previously described third embodiment of FIG. 14, except that in those embodiments of FIGS. 16 and 17, the retainers 5A (FIG. 14) employed in the cylindrical roller bearing 1A are replaced with a comb-shaped retainer 5B. While the retainer 5A employed in the example shown in FIG. 14 is of a cage type designed to have pockets each embracing the corresponding rolling element 4A in the form of a cylindrical roller, the comb-shaped retainer 5B has pockets each designed to encompass the corresponding rolling element 4A in the form of a cylindrical roller from three directions while opening in one direction. Because of this, a generally ring-shaped guide side plate 19 adjoining an end face of a cylindrical portion of the comb-shaped retainer 5B is fixed to one of the collars of the inner race 2A or the outer race 3A remote from the nozzle member 6. More specifically, a cutout is formed in an outer portion of the collar with respect to the widthwise direction of the bearing assembly over the entire circumference of the collar, and a portion of the guide side plate 19 is engaged in such cutout to thereby fix the guide side plate 19 in a manner sandwiched between the collar and the spacer adjoining the collar.

In the example shown in FIG. 16, the inner race 2A has the collars while the outer race 3A is collarless in a fashion substantially reverse to those in the example shown in FIG. 14, whereas in the example shown in FIG. 17, the inner race 2A is collarless while the outer race 3A has the collars in a fashion similar to those in the example shown in FIG. 14.

It is to be noted that in each of the embodiments shown in FIGS. 16 and 17, the air/oil supply passages 13c and 13d defined in the outer race spacer 10 are arranged axially laterally of the nozzle member 6 in a manner similar to that in the embodiment shown in and described with particular reference to FIG. 9. The discharge passage 8 of the nozzle member 6 are so disposed that only an inlet of the neighboring portion 8b is oriented parallel to the axial direction of the bearing assembly 1A and the remaining portion of the neighboring portion 8b is oriented towards the inclined surface area 2b.

Other structural features of each of the embodiments shown in and described with particular reference to FIGS. 16 and 17, respectively, are substantially similar to those in the second embodiment shown in and described with particular reference to FIG. 9.

Figure 18:
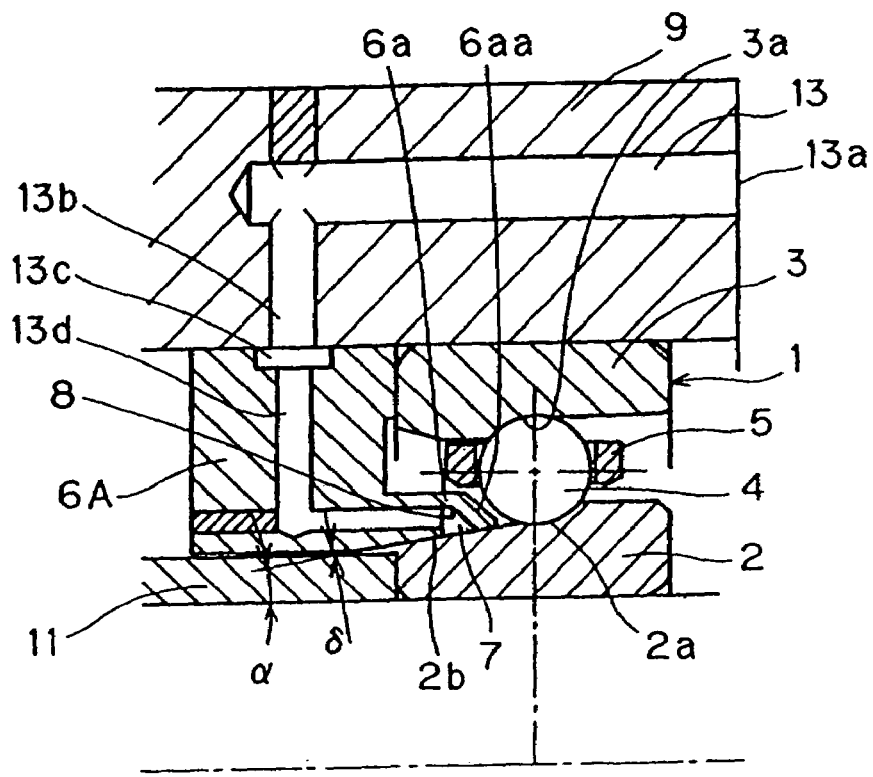
FIG. 18 is a sectional view of an air/oil lubricating structure according to a seventh preferred embodiment of the present invention.

FIG. 18 illustrates an air/oil lubricating structure for the rolling bearing assembly according to a seventh preferred embodiment of the present invention. In this embodiment, the discharge passage 8 defined in the nozzle member 6A is so positioned that the air/oil mixture can be jetted into the discharge groove 7 in a direction parallel to the axial direction of the rolling bearing 1. The discharge groove 7 have side faces facing the discharge passage 8, which are formed as an inclined surface so that the air/oil mixture jetted can be guided towards the inclined surface area 2b of the inner race 2. The nozzle member 6A is fitted directly to the inner peripheral surface of the housing 9 and concurrently serves as an outer race spacer. This nozzle member 6A may, instead of being fitted directly to the housing 9, be fitted as engaged in the cutout recess 10a defined in the outer race spacer 10 employed in the example shown in and described with particular reference to FIG. 9A.

Other structural features of the embodiment shown in FIG. 18 are substantially similar to those shown in and described with particular reference to FIGS. 9A and 9B, except for the differences specifically described above. Even where the nozzle member 6A of the structure employed in this embodiment is employed, the bearing assembly 1 may be a cylindrical roller bearing as is the case with the embodiment shown in and described with particular reference to FIG. 14.

Figure 19:
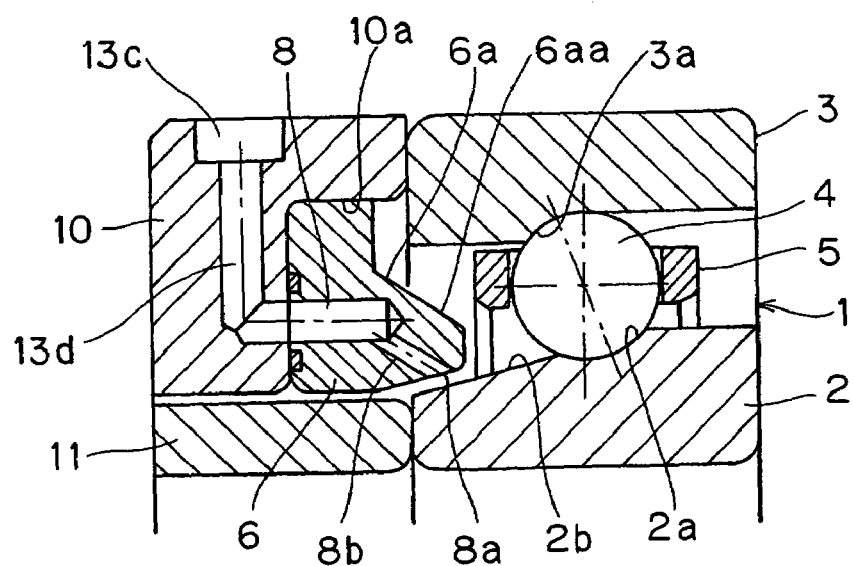
FIG. 19 is a sectional view of an air/oil lubricating structure according to an eighth preferred embodiment of the present invention.

FIG. 19 illustrates an air/oil lubricating structure for the rolling bearing assembly according to an eighth preferred embodiment of the present invention. This embodiment is substantially similar to the first embodiment shown in FIG. 9A, except that in this embodiment the discharge groove 7 of the nozzle member 6 is dispensed with. Other structural features of the embodiment shown in FIG. 19 are substantially similar to those shown in and described with particular reference to FIG. 9A.

Figure 20A:
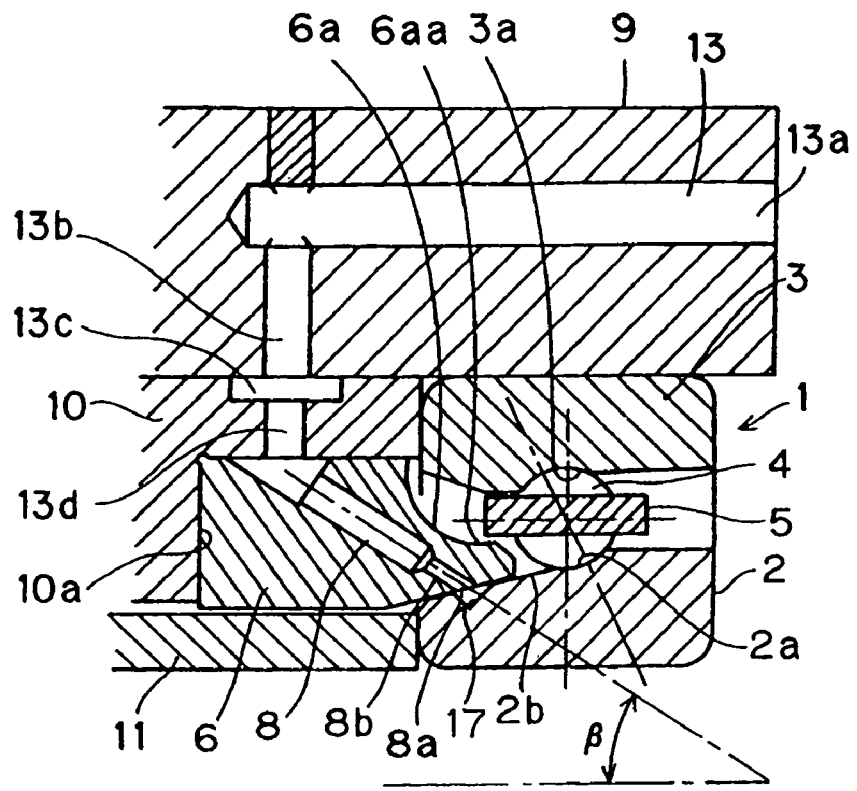
FIG. 20A is a sectional view of an air/oil lubricating structure according to a ninth preferred embodiment of the present invention.
Figure 20B:
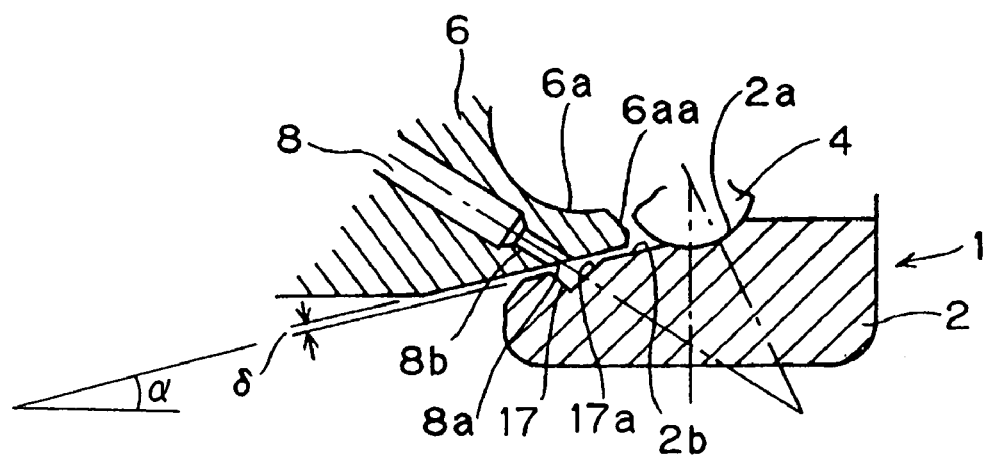
FIG. 20B is a fragmentary enlarged view of FIG. 20A.

FIGS. 20A and 20B illustrate an air/oil lubricating structure for the rolling bearing assembly according to a ninth preferred embodiment of the present invention. This embodiment is substantially similar to the first embodiment shown in and described with particular reference to FIGS. 9A and 9B, except that in this embodiment the discharge groove 7 in the nozzle member 6 is dispensed with and, instead, a circumferential groove 17 is formed in the inclined surface area 2b of the inner race 2.

The circumferential groove 17 is of an annular shape extending circumferentially and has a generally V-shaped section. The nozzle member 6 is provided with a discharge passage 8 having a discharge port 8a opening towards the circumferential groove 17 in the inclined surface area 2b of the inner race 2. The discharge passage 8 is employed at one location or a plurality of locations of the circumference of the nozzle member 6. The discharge passage 8 is so disposed that the direction of discharge from the discharge port 8a is oriented towards the circumferential groove 17 and at an angle of inclination $\alpha$ relative to the inclined surface area 2b so that the air/oil mixture discharged from the discharge passage 8 can be jetted directly onto the circumferential groove 17 in the inclined surface area 2b of the inner race 2. The angle of inclination of one of inclined side wall faces 17a of the generally V-sectioned circumferential groove 17 adjacent the raceway 2a with respect to the axial direction of the rolling bearing is larger than the angle of inclination $\alpha$ of the inclined surface area 2b of the inner race 2.

Other structural features of the embodiment shown in FIGS. 20A and 20B are substantially similar to those shown in and described with particular reference to FIGS. 9A and 9B.

The operation of the air/oil lubricating structure so constructed as described hereinabove will now be described. The air/oil mixture supplied from the air/oil supply port 13a shown in FIG. 20A is jetted onto the inclined side wall face 17a of the circumferential groove 17 in the inclined surface area 2b of the inner race 2 through the discharge passage 8 in the nozzle member 6.

Since the angle of inclination of the inclined side wall face 17a is larger than that of the inclined surface area 2b of the inner race 2, the oil deposited on the inclined side wall face 17a can be guided towards the inclined surface area 2b of the inner race 2 by the effect of the centrifugal force, finally flowing into the interior of the bearing assembly 1 as a lubricant oil. Also, even when, as a result of the amount of air supplied being small, an uneven flow of the air/oil mixture is developed on the circumference of the inclined surface area 2b, the lubricant oil can flow towards the bearing assembly 1 because of the suction force developed by a negative pressure occurring within the gap δ between the inclined surface area 2b of the inner race 2 and the nozzle member 6 and subsequently deposits on the inner peripheral surface of the retainer 5 or the rolling elements 4, thus functioning as a lubricant oil for the bearing assembly 1. Because of this, stagnation of the oil resulting from the insufficient amount of the air can be prevented and any undesirable variation of the bearing temperature resulting from the stagnation of the oil can also be avoided.

As described hereinabove, since the air/oil mixture is supplied into the circumferential groove 17 in the inclined surface area 2b of the inner race 2 and is not jetted directly onto the raceway 2a for the rolling elements 4, no wind sound resulting from revolution of the rolling elements 4 is generated with the noise level consequently lowered. Also, since the lubricant oil is not supplied by an air spray, but the air/oil mixture supplied onto the circumferential groove 17 in the inclined surface area 2b of the bearing inner race 2 is guided into the bearing 1 by the effect of rotation of the bearing inner race 2, the air used merely serves to transport the lubricant oil to the circumferential groove 17 of the bearing inner race 2 and, therefore, the amount of air used can be reduced. For this reason, the energy saving effect can also be expected as a result of reduction in the amount of air used. In addition, where the discharge ports 8a, which define the respective outlets of the discharge passages 8, has a small diameter, the velocity of flow of the air/oil mixture can be increased accompanied by reduction of the temperature of the discharged air. This air of the reduced temperature is jetted a small distance onto the inner race 2 and, therefore, lowering of the inner race temperature can be expected.

In the case of this embodiment, as described above, even when the amount of the air is reduced, any undesirable variation of the bearing temperature resulting from the stagnation of the oil can be avoided and, in combination with the effect of reducing the noises, an effect can also be expected in which the amount of the air/oil mixture can further be reduced.

Figure 21A:
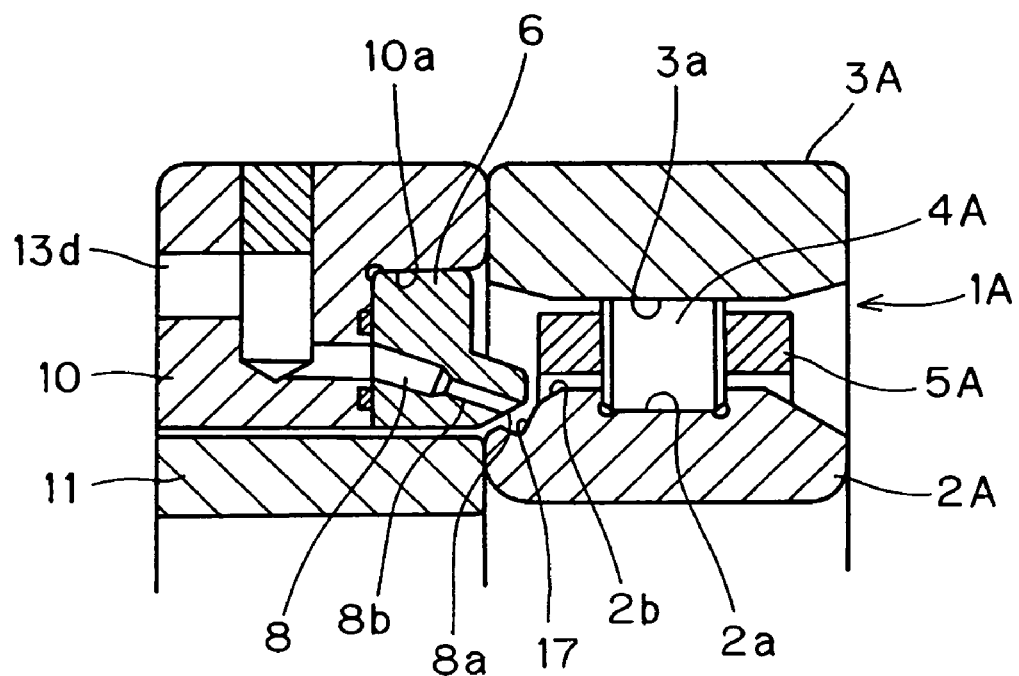
FIG. 21A is a sectional view of an air/oil lubricating structure according to a tenth preferred embodiment of the present invention.

FIG. 21A illustrates an air/oil lubricating structure for the rolling bearing assembly according to a tenth preferred embodiment of the present invention. This embodiment is substantially similar to the eighth embodiment shown in and described with particular reference to FIG. 20A, except that in this embodiment the rolling bearing assembly 1 is replaced with a cylindrical roller bearing 1A. The cylindrical roller bearing 1A includes the collarless outer race 3A and the inner race 2A having the collars at its opposite ends and also include a plurality of rolling elements 4A each in the form of a cylindrical roller rollingly interposed between the respective raceways 2a and 3a of the inner and outer races 2A and 3A. While the air/oil supply passage 13d defined in the outer race spacer 10 extends axially, it is finally communicated with the air/oil supply port 13a in the housing 9 (FIG. 20A).

Figure 21B:
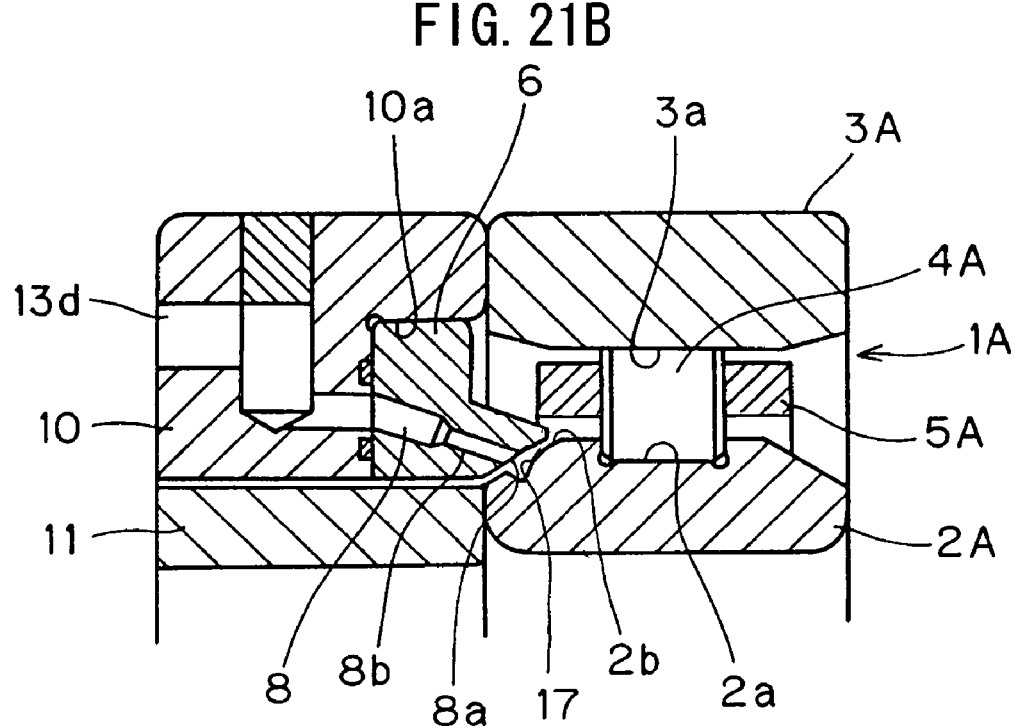
FIG. 21B is a sectional view of a modified form of the air/oil lubricating structure according to the tenth preferred embodiment of the present invention.

Even in this embodiment, as shown in FIG. 21B, the tip of the nozzle member 6 may be plunged radially inwardly of the retainer 5A.

Figure 22:
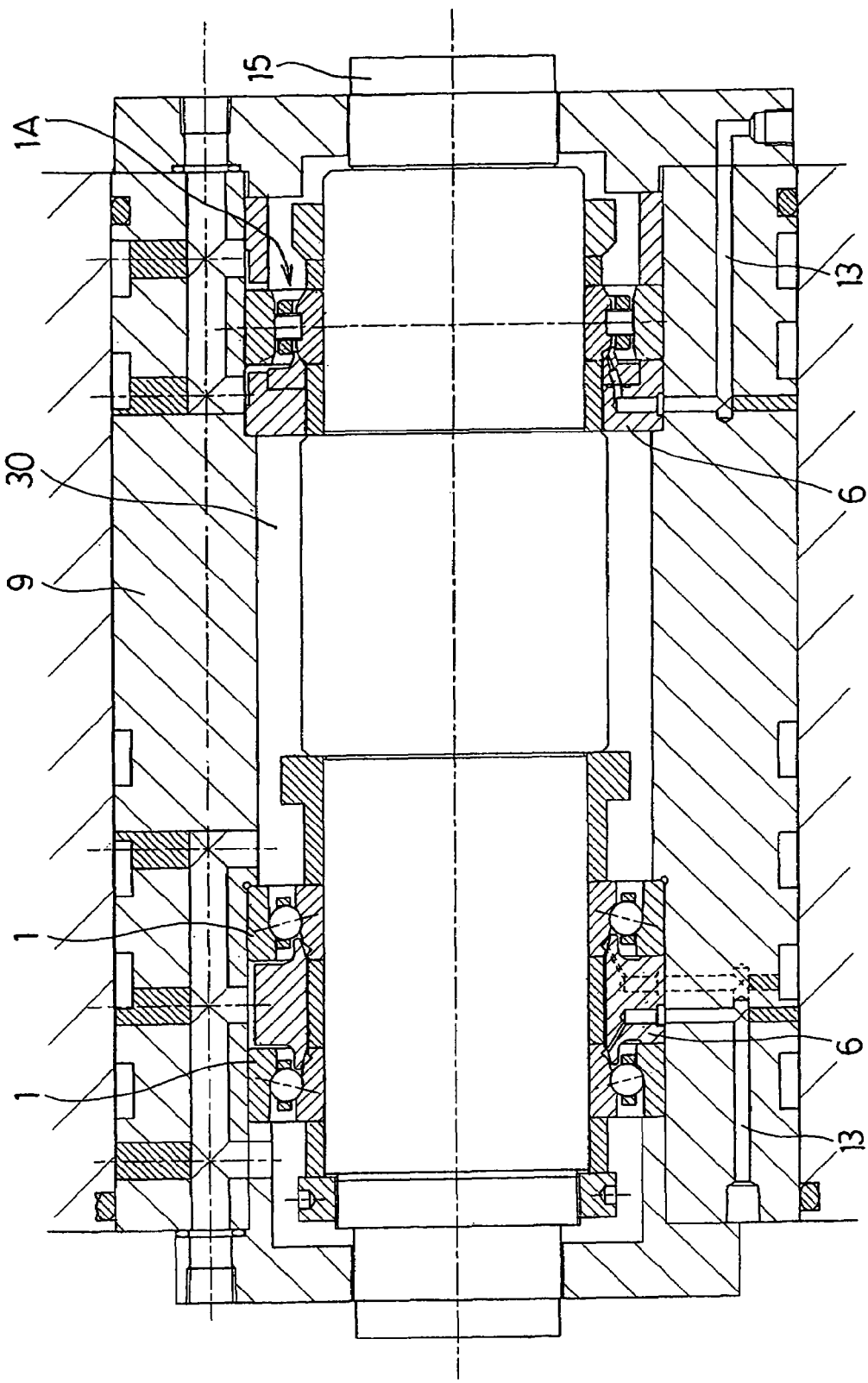
FIG. 22 is a sectional view of a spindle device according to an eleventh preferred embodiment of the present invention.

FIG. 22 illustrates a spindle device according to an eleventh preferred embodiment of the present invention. The illustrated spindle device employs the air/oil lubricating structure according to the embodiments shown in and described with particular reference to, for example, FIG. 9A or FIGS. 15A and 15B. The spindle device is generally applied in a machine tool and includes a spindle 15 having its tip to which a tool or a work chuck is mounted for rotation together therewith. A plurality of rolling bearings for supporting the spindle 15 includes a front bearing 1, which is fixed in position and positioned adjacent the tip of the spindle 15, and a rear bearing 1A, which is a free side and positioned adjacent a rear end of the spindle 15 and operable to dissipate heat evolved in the spindle 15 during the operation of the spindle device. The air/oil lubricating structures according to the embodiments shown in FIG. 9A and FIGS. 15A and 15B, respectively, are employed in those bearings 1 and 1A.

Figure 15B:
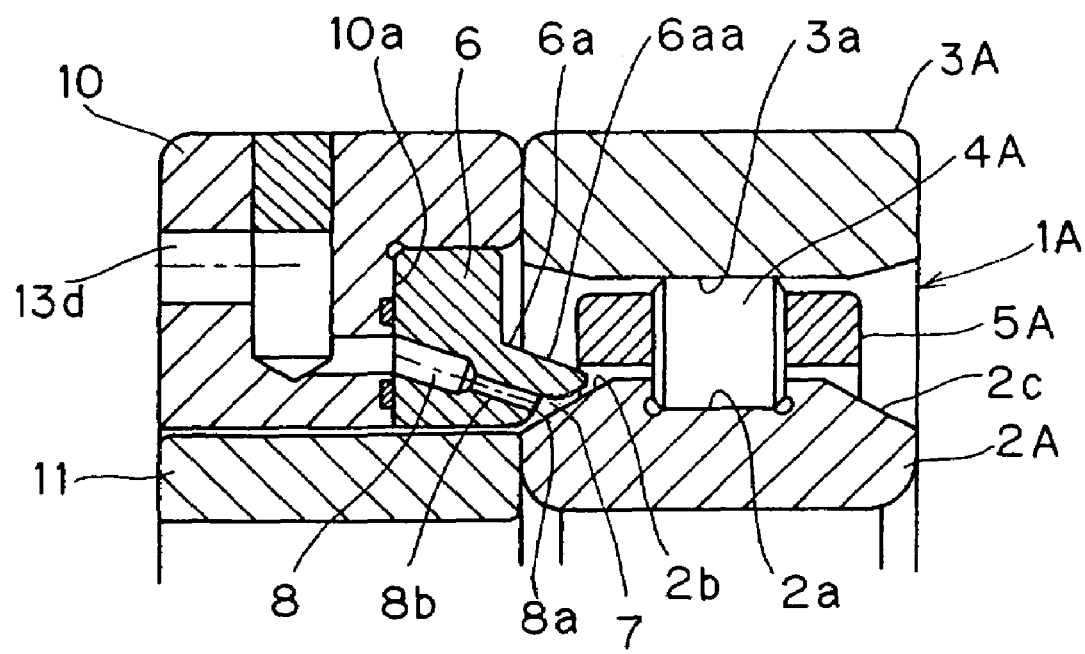
FIG. 15B is a sectional view of a modified form of the air/oil lubricating structure according to the fourth preferred embodiment of the present invention.

So far shown, for the front bearing 1, a plurality of angular ball bearings shown in and described with particular reference to FIG. 9A are employed, whereas for the rear bearing 1A, a cylindrical roller bearing shown in and described with particular reference to FIG. 15B is employed. It is, however, to be noted that the bearing assembly shown in FIGS. 21A and 21B may be employed for the rear rolling bearing assembly 1A. To each of the front rolling bearing assemblies 1, the air/oil mixture can be supplied through the air/oil supply passage 13, defined so as to extend in part in the housing 9 and in part in the nozzle member 6, via the discharge passage 8 in the nozzle member 6 and can then be jetted onto the inclined surface area 2b of the inner race of the respective rolling bearing assembly 1. Similarly, to the rear rolling bearing assembly 1A, the air/oil mixture can be supplied through the air/oil supply passage 13, defined so as to extend in part in the housing 9 and in part in the nozzle member 6, via the discharge passage 8 in the nozzle member 6 and can then be jetted onto the inclined surface area 2b of the inner race of the rolling bearing assembly 1A. The rear rolling bearing assembly 1A is a cylindrical roller bearing including the inner race 2A having the collars formed at its opposite ends and the nozzle member 6 is arranged at a location confronting the front rolling bearing assemblies 1 so that the air/oil mixture can be jetted onto the inclined surface area 2b of the inner race 2A which confronts the front rolling bearing assemblies 1.

Figure 23:
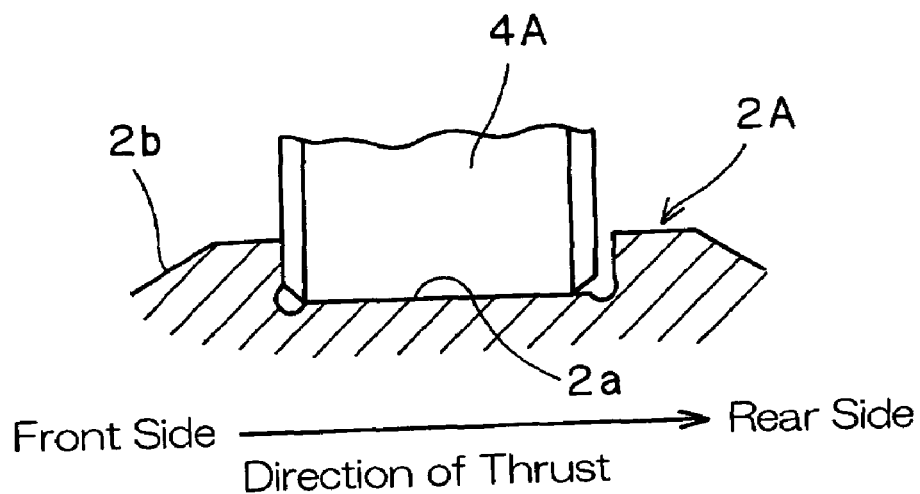
FIG. 23 is a fragmentary enlarged view of a portion of a cylindrical roller bearing used in the spindle device.
Figure 24:
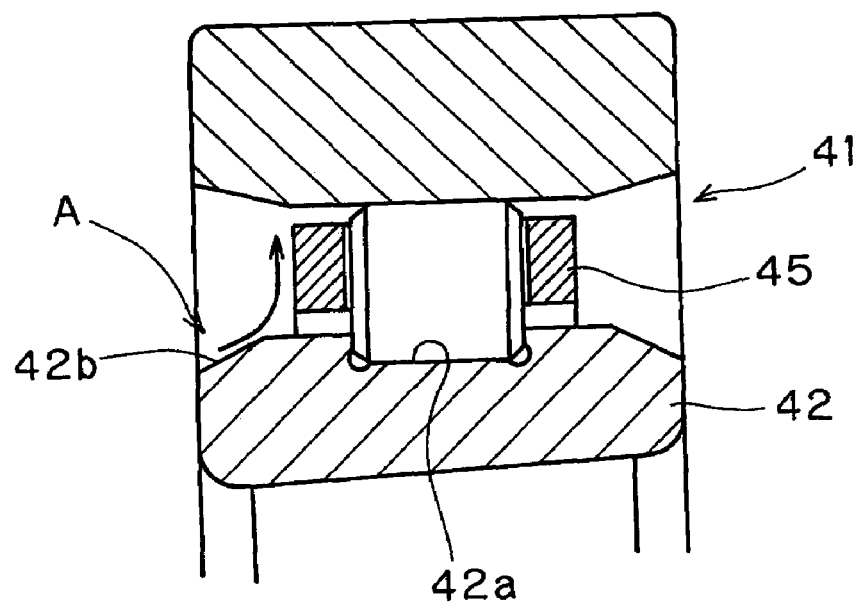
FIG. 24 is a sectional view of the conventional example.

In the spindle device of the structure described above, since the rear rolling bearing assembly 1A is employed in the form of a cylindrical roller bearing, one of the collars of the inner race 2A of the rear rolling bearing assembly 1A, which confronts the front rolling bearing assemblies 1, generates a thrust force acting on respective end faces of the cylindrical rollers 4A, under the influence of a thermal expansion of the spindle 15 resulting from heat evolved during the operation, as shown in FIG. 23 on an enlarged scale. In other words, the contact pressure at the area of contact between the front collar of the inner race 2A and the end face of the cylindrical roller 4A in the rear rolling bearing assembly 1A increases. In contrast thereto, the thrust force resulting from the thermal expansion of the spindle does not bring about any influence on between the rear collar of the inner race 2A and the end face of the cylindrical roller 4A in the rear rolling bearing assembly 1A. As a result thereof, the area of contact between the front collar of the inner race 2A and the end face of the cylindrical roller 4A in the rear rolling bearing assembly 1A is held under disadvantageous conditions sensitive to the sliding friction during the operation as compared with the rear collar of the inner race 2A and, unless such area of contact between the front collar and the end face of the cylindrical roller 4A are sufficiently lubricated, an abnormal heat tends to be generated, resulting in the possibility that the contact area may wear with worn chips intruding inwardly of the rolling bearing assembly 1A.

However, with the spindle device according to this embodiment, since the air/oil mixture can be jetted onto the front side inclined surface area 2b of the inner race 2A of the rear rolling bearing assembly 1A through the discharge passage 8 in the nozzle member 6, the area of contact between the front collar of the inner race 2A and the end face of the cylindrical roller 4a of the bearing assembly 1A can be preferentially lubricated with the lubricant oil, thus eliminating the inconveniences and disadvantages discussed hereinabove.

Also, lubricating the rear rolling bearing assembly 1A from the front side of the spindle device means that the air/oil mixture can be supplied from inwardly of a space 30 delimited by the spindle 15, the front rolling bearing assemblies 1, the rear rolling bearing assembly 1A and the housing 9 and, in addition, since the amount of the air supplied during the air/oil lubrication is approximately 10 to 40 NI/min, the pressure inside the space 30 tends to be high as compared with the pressure outside the space 30. As a result, a coolant or the like will hardly enter into the space 30 including the bearing assemblies 1 and 1A and, accordingly, an undesirable intrusion of foreign matters into the interior of the rolling bearing assemblies 1 and 1A can advantageously be avoided.

What is claimed is:

1. A lubricating method for a rolling bearing assembly for supplying a lubricant oil to the rolling bearing assembly during an operation of the rolling bearing assembly, comprising:
   adjusting the amount of the lubricant oil supplied during the operation of the rolling bearing assembly depending on a preset condition to suppress a temperature rise of the rolling bearing assembly,
   wherein the preset condition is associated with the rotational speed of the rolling bearing assembly, and
   the amount of the lubricant oil to be supplied is preset for each of three or more divided rotational speed regions of the rolling bearing assembly and one of the preset amounts of the lubricant oil to be supplied is selected according to an input information on the rotational speed.

2. The lubricating method for the rolling bearing assembly as claimed in claim 1, wherein the supply of the lubricant oil is carried out in a state of air/oil mixture.

3. The lubricating method for the rolling bearing assembly as claimed in claim 1, wherein the amount of the lubricant oil to be supplied during the operation is adjusted in dependence on the rotational speed of the rolling bearing assembly.

4. The lubricating method for the rolling bearing assembly as claimed in claim 3, wherein data on increase of the temperature of the rolling bearing assembly in dependence on the rotational speed are sampled under a plurality of lubricating conditions with different amounts of the lubricant oil to be supplied, and based on the result of sampling, the amount of the lubricant oil to be supplied is adjusted in dependence on the rotational speed.

5. The lubricating method for the rolling bearing assembly as claimed in claim 4, wherein when the sampling data are expressed in a graph having the axis of abscissa representing the rotational speed and the axis of ordinates representing the bearing temperature, the lubricating condition is changed in dependence on the rotational speed to take a combination of the lubricating conditions effective to substantially avoid generation of a point of maximum or to lower the point of maximum.

6. The lubricating method for the rolling bearing assembly as claimed in claim 3, wherein change of the amount of the lubricant oil to be supplied during the operation is automatically performed in response to an information signal indicative of the rotational speed, in dependence on a preset condition.

7. The lubricating method for the rolling bearing assembly as claimed in claim 1, wherein change of the amount of the lubricant oil to be supplied during the operation is performed manually.

8. A lubricating device for the rolling bearing assembly, comprising:
   a lubricant supply unit to supply a lubricant oil during the operation of the rolling bearing assembly, and
   a supply adjusting unit to order the lubricant supply unit to change the amount of the lubricant oil to be supplied in dependence on a preset condition,
   wherein the preset condition is associated with the rotational speed of the rolling bearing assembly, and
   the amount of the lubricant oil to be supplied is preset for each of three or more divided rotational speed regions of the rolling bearing assembly and the supply adjusting unit is operable to select one of the preset amounts of the lubricant oil to be supplied according to an input information on the rotational speed.

9. The lubricating device for the rolling bearing assembly as claimed in claim 8, wherein the lubricant supply unit is operable to discharge an air/oil mixture towards the rolling bearing assembly.

10. The lubricating device for the rolling bearing assembly as claimed in claim 8, wherein the lubricant supply unit supplies the lubricant oil intermittently and the supply adjusting unit is operable to change the interval of supply of the lubricant oil performed by the lubricant supply unit.

11. The lubricating device for the rolling bearing assembly as claimed in claim 8, wherein the rolling bearing assembly is used to support a spindle of a machine tool.

* * * * *